United States Patent [19]

Narabu

[11] Patent Number: 5,453,604
[45] Date of Patent: Sep. 26, 1995

[54] BINARY CIRCUIT AND IMAGE PICK-UP APPARATUS INCLUDING SUCH BINARY CIRCUIT

[75] Inventor: Tadakuni Narabu, Kanagawa, Japan

[73] Assignee: Sony Corporation, Japan

[21] Appl. No.: 252,568

[22] Filed: May 31, 1994

[30] Foreign Application Priority Data

Jun. 3, 1993 [JP] Japan .................................. 5-133347

[51] Int. Cl.[6] ................................................. G06K 7/10
[52] U.S. Cl. ........................................... 235/462; 235/472
[58] Field of Search .................................. 235/462, 472, 235/443, 463, 494, 375; 307/231, 236

[56] References Cited

U.S. PATENT DOCUMENTS

| 3,892,949 | 7/1975 | Dodson, III | 235/462 |
| 4,740,675 | 4/1988 | Brosman et al. | 235/462 |
| 4,801,788 | 1/1989 | Osaka | 235/462 |
| 5,061,843 | 10/1991 | Sato et al. | 235/462 |

FOREIGN PATENT DOCUMENTS

| 0165979 | 7/1988 | Japan | 235/462 |

Primary Examiner—Donald Hajec
Assistant Examiner—Thien Minh Le
Attorney, Agent, or Firm—Ronald P. Kananen

[57] ABSTRACT

Binary information of input signal obtained from positions separated spatially or in point of time, e.g., image pick-up signals from an image sensor can be obtained with high accuracy by a simple circuit configuration. A circuit therefor can be implemented as on-chip configuration within the image sensor. A first comparator set so that a potential on the + terminal is caused to be higher than a potential on the − terminal by voltage V1, a second comparator set so that a potential on the + terminal is caused to be lower than a potential on − terminal by voltage V2, and a JK flip-flop circuit are arranged. One of two signal output sections having quantities of delays different from each other of the final stage in charge transfer section is connected to respective + terminals of the two comparators, the other signal output section is connected to respective − terminals of the two comparators, inverting Q terminal of the first comparator and J terminal of JK flip-flop circuit are connected, and Q terminal of the second comparator and K terminal of JK flip-flop circuit are connected. Thus, binary circuit suitable for, e.g., binarization of output information of an image sensor of a CCD image pick-up apparatus for a bar code reader is provided.

6 Claims, 19 Drawing Sheets

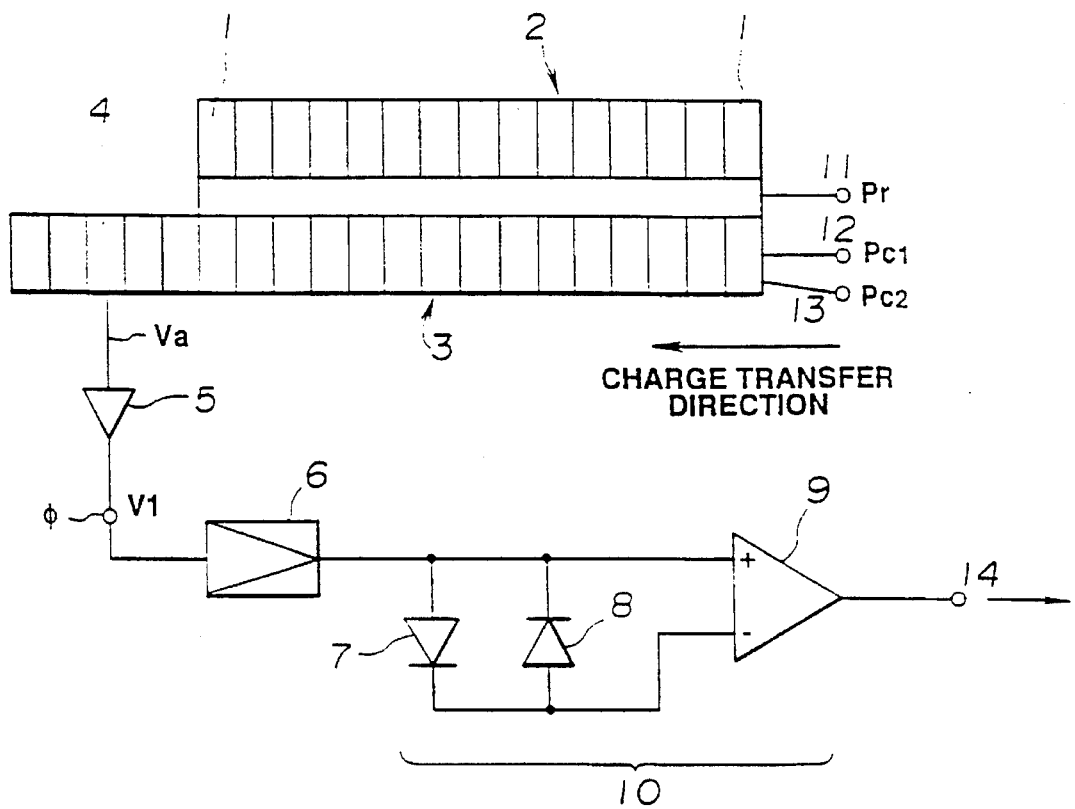
FIG.1 PRIOR ART
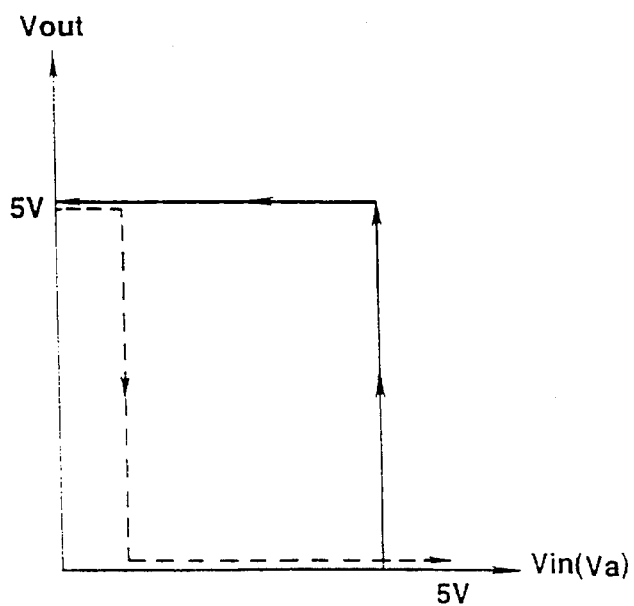
FIG.2 PRIOR ART

BINARY CIRCUIT AND IMAGE PICK-UP APPARATUS INCLUDING SUCH BINARY CIRCUIT

BACKGROUND OF THE INVENTION

1. Field of the Invention

This invention relates to a binary circuit applied to binarization of an input signal, and more particularly to binary circuit adapted to output image pick-up signals obtained (sampled) from positions spatially separated of an object to be imaged as a binary signal, and a CCD solid-state image pick-up apparatus provided with such a binary circuit. Especially, the CCD image pick-up apparatus provided with such binary circuit is suitable when used as a bar code reader adapted for reading a mark such as a bar code, etc. attached on a medium to convert it into a binary signal.

2. Description of the Related Arts

Generally, bar codes are adapted to indicate information such as name of manufacturer (marker) or name of goods, etc. on a medium, etc. by combination of lines of different thicknesses, and such bar codes are read by an optical detecting method and are utilized for aggregate (sum total) of the amount sold of goods or analysis of circulation thereof, etc.

As an apparatus for reading bar codes by the optical detecting method, a CCD image sensor is mainly used. Namely, an output from the CCD image sensor is delivered to a binary circuit to take out combination of lines of different thicknesses as binary information to detect the binary information thus taken out as bar code information. In this case, there is generally employed a method of obtaining binary information while comparing a level (voltage) of an image pick-up signal with a threshold voltage at a comparator.

However, in binarization of an output from the CCD image sensor, since reflection of a print surface of the bar code does not become uniform by the influence of unevenness of the surface of a medium on which bar codes are, printed, or an extraneous light, it is difficult to allow output data to be binary information (i.e., binarize output data) while maintaining the threshold voltage at a fixed value. For this reason, in the prior art, a circuit adapted for inverting a current image pick-up signal when a change of the signal level more than a predetermined absolute value takes place relative to an image pick-up signal immediately before is made up outside the CCD image sensor.

A conventional bar code reader, will now be described with reference to FIG. 1. A CCD image sensor constituting this bar code reader includes an image pick-up region 2 where a large number of light receiving portion 1 for converting an incident light into a signal charge quantity corresponding to a light quantity thereof are arranged, and a charge transfer section 3 for unidirectionally transferring signal charges from the image pick-up region 2. At the succeeding stage of a charge voltage converting section 4 comprised of, e.g., floating gate formed in the vicinity of the final stage in the charge transfer section 3 of this CCD image sensor, an amplifier 5 comprised of, e.g., a source-follower circuit for current-amplifying an image pick-up signal Va from the voltage converting section 4 is formed on the same substrate.

To external terminal φ drawn from the amplifier 5 to the external, an amplifier 6 for level-amplifying the image pick-up signal Va current-amplified by the amplifier 5, and a binary circuit 10 for inverting a current image pick-up signal when a change of the signal level more than a predetermined absolute value takes place relative to an image pick-up signal immediately before are connected. Thus, bar code reader is constituted. In this bar code reader, as shown in the figure, external amplifier 6 having high degree of amplification is selected, and a logic circuit using diodes D7 and D8 is used as binary circuit 10 connected to the external. The input/output characteristic of the binary circuit 10 has as shown in FIG. 2, a hysteresis characteristic such that in the case where an output voltage Vout is, e.g., 5 volts which is the power supply voltage when input voltage Vin is, e.g., zero volts, output voltage Vout is inverted to zero volts when input voltage Vin is increased from zero volts by about 0.8 volts which is a voltage drop level of diodes D7 and D8, while in the case where output voltage Vout is zero volts when input voltage Vin is, e.g., 5 volts, output voltage Vout is inverted to 5 volts when input voltage Vin is decreased from 5 volts by about 0.8 volts which is the voltage drop level of diodes D7 and D8.

Accordingly, when the signal level of a current image pick-up signal Va varies by more than ±0.8 volts relative to the signal level of the last image pick-up signal Va, the output is inverted. Thus, it is possible to take out this inverted output as binary information.

However, since the binary circuit 10 used in the conventional bar code reader requires a logic circuit using amplifier 8 of high degree of amplification and diodes D7 and D8, the circuit configuration itself becomes complicated. Accordingly, it is difficult to make up such binary circuit within the CCD image sensor, i.e., to allow it to have on-chip configuration. Particularly, it is still more difficult to embody such binary circuit as on-chip configuration within a CCD image sensor driven by a low voltage such as power supply voltage of 3 volts, etc.

The reason whey such difficulty exists is that in the case where a logic circuit using diodes D7 and D8 is used, about 0.8 volts corresponding to voltage drop level $V_{BE}$ of diodes D7 an D8 becomes a dead zone in the hysteresis characteristic. Accordingly, a voltage larger than 2~3 volts which is more than 0.8 volts is required as the signal amplitude within the CCD image sensor. It is extremely difficult to deal with such a large signal amplitude in the CCD image sensor having power supply of 3 volts.

Further, for the purpose of obtaining in practice binary information with high accuracy by this binary circuit 10, the circuit configuration shown in FIG. 1 is insufficient. For this reason, there are also instances where an offset circuit is inserted between amplifier 6 and binary circuit 10 to deliver an output from the binary circuit 10 to a microcomputer connected to the external to allow the offset circuit to undergo feedback control by this microcomputer to further control the gain of amplifier 6.

As stated above, the circuit configuration of binary circuit 10 used in the conventional bar code reader is very complicated, and a greater number of parts are required. As a result, there was the problem that binary circuit 10 cannot be embodied as on-chip configuration within the CCD image sensor, so there takes place limitation in miniaturization of the size of the bar code reader itself. In addition, there is the problem that power consumption is increased, so this does not suit with current tendency of low level power supply voltage.

OBJECTS AND SUMMARY OF THE INVENTION

A first object of this invention is to provide a binary circuit which can obtain binary information of input signals provided (sampled) from positions separated spatially or in point of time with high accuracy by a simple circuit configuration, and which can attain reduction of the number of parts and low power consumption.

A second object of this invention is to provide a binary circuit which can obtain binary information of image pick-up signals from a CCD image sensor with high accuracy by a simple circuit configuration, and which can be embodied as on-chip configuration within the CCD image sensor.

A third object of this invention is to provide a CCD solid-state image pick-up apparatus which can obtain binary information of image pickup signals with high accuracy by a simple circuit configuration, and which can attain reduction of the number of parts and low power consumption.

A fourth object of this invention is to provide a CCD solid-state image pickup apparatus provide with a binary circuit implemented as on-chip configuration which can obtain binary information of image pick-up signals with high accuracy by a simple circuit configuration.

A binary circuit of this invention is constituted by the provision of comparing mean having a hysteresis characteristic and adapted so that, e.g., image pick-up signals obtained from positions spatially separated of an object to be imaged are inputted thereto to carry out level comparison between these image pick-up signals and detecting means adapted for detecting a level change point of an output signal from the comparing means to prepare a binary signal.

In this case, the comparing means may be composed of a first comparator adapted for equivalently adding an offset potential to one input to carry out level comparison between the image pick-up signals and a second comparator adapted for equivalently subtracting an offset potential from one input to carry out level comparison between the image pick-up signals.

Further, the above-mentioned comparing means may be composed of a first comparator such that when potentials on two input terminals supplied with image pick-up signals obtained from positions spatially separated of an object to be imaged are unequally set and signals of the same potential are inputted to the two input terminals, the first comparator outputs a signal of high level; and a second comparator such that when potential on two input terminals supplied with image pick-up signals obtained from positions spatially separated of the object to be imaged are unequally set and signals of the same potential are inputted, the second comparator outputs a signal of low level. Further, the above-mentioned detecting means may be comprised of a flip-flop circuit adapted to be set by an input of the signal of low level from the first comparator and to be reset by an input of the signal of high level from the second comparator.

In the case of allowing such binary circuit to function as a binary circuit in the CCD image sensor, signals having quantities of delays different from each other in the charge transfer section by CCD may be used as image pick-up signals obtained from positions spatially separated of an object to be imaged.

On the other hand, a CCD solid-state image pick-up apparatus according to another invention is composed of an image pick-up region where a large number of light receiving sections for converting an incident light into a quantity of signal charges corresponding to a light quantity thereof are arranged a charge transfer section by CCD for unidirectionally transferring signal charges from the image pick-up region, and a binary circuit comprising comparing means having a hysteresis characteristic and adapted for carrying out level comparison between image pick-up signals from signal output sections having quantities of delays different from each other in the charge transfer section, and detecting means for detecting a level change point of an output signal from the comparing means to prepare a binary signal.

In this case, the above-mentioned comparing means may be comprised of a first comparator for equivalently adding an offset potential to one input to carry out level comparison between the image pick-up signals and a second comparator for equivalently subtracting an offset potential from one input to carry out level comparison between the image pick-up signals.

Further, the above-mentioned comparing means may be composed of a first comparator such that when potentials on two input terminals supplied with image pick-up signals obtained from signal output sections having quantities of delays different from each other are unequally set and signals of the same potential are inputted to the two input terminals, the first comparator outputs a signal of high level; and a second comparator such that when potentials on two input terminals supplied with image pick-up signals obtained from signal output sections having quantities of delays different from each other are unequally set and signals of the same potential are inputted to the two input terminals, the second comparator outputs a signal of low level. Further, the above-mentioned detecting means may be comprised of a flip-flop circuit adapted an input of the signal of low level from the first comparator and to be reset by an input of the signal of high level from the second comparator.

In operation, in the binary circuit according to this invention, image pick-up signals obtained from positions spatially separated of an object to be imaged are first inputted to the comparing means. Because this comparator means has hysteresis characteristic, when a level change between respective inputted image pick-up signals is above a predetermined value, its output varies.

In a more practical sense, the first comparator constituting the comparing means equivalently adds an offset potential to an image pick-up signal delivered to one input of image pick-up signals obtained from positions spatially separated of object to be imaged to carry out level comparison between respective inputted image pick-up signals. Further, the second comparator constituting the comparator means equivalently subtracts an offset potential from an image pick-up signal delivered to one input of image pick-up signals obtained from positions spatially separated of object to be imaged to carry out level comparison between respective inputted image pick-up signals. Thus, the hysteresis characteristic is equivalently added to the comparing means.

Further, in the comparing means of other structure, the first comparator is adapted so that when signals of the same potential are inputted to two input terminals of the first comparator, potentials on respective input terminals are unequally set so as to output a signal of high level. Further, the second comparator is adapted so that when signals of the same potential are inputted to two input terminals, potentials on respective input terminals are unequally set so as to output a signal of low level. Thus, the comparing means constituted with these comparators has hysteresis characteristic.

The detecting means detects a level change point of an output signal from the comparing means to prepare a binary signal. In more practical sense this detecting means is comprised of a flip-flop circuit adapted to be set by an input of the signal of low level from the first comparator and to be reset by an input of the signal of high level from the second comparator. Thus, a binary signal is prepared on the basis of the level change point of an output signal from the comparing means and is outputted from the detecting circuit.

As stated above, since the binary circuit according to this invention can be constituted with only comparing means and detecting means, the circuit configuration of the binary circuit is simplified. In addition, binary information can be obtained with high accuracy. Accordingly, it is possible to attain reduction of the number of parts and low power consumption.

Particularly, in the case where outputs, i.e., image pick-up signals from signal output sections having quantities of delays different from each other in the charge transfer section of the CCD image sensor are used as image pick-up signals obtained from positions spatially separated of object to be imaged, binary information of image pick-up signals from the CCD image sensor can be obtained with high accuracy by a simple circuit configuration. Thus, binary circuit can be embodied as on-chip configuration within the CCD image sensor.

Since the CCD solid-state image pick-up apparatus according to another invention has binary circuit constructed as above, image pick-up signals from signal output sections having quantities of delays different from each other in the charge transfer section are inputted to the comparing means. Since this comparing means has hystresis characteristic, when a level change between respective inputted image pick-up signals is above a predetermined value, it output varies.

In more practical sense, the first comparator constituting the comparing means equivalently adds an offset potential to an image pick-up signal delivered to one input of image pick-up signals obtained from signal output sections having different quantities of delays to carry out level comparison between inputted respective image pick-up signals. Further, the second comparator constituting the comparing means equivalently subtracts an offset potential from an image pick-up signal delivered to one input of image pick-up signals obtained from signal output sections having different quantities of delays to carry out level comparison between respective inputted image pick-up signals. Thus, hysteresis characteristic is equivalently added to the comparing means.

Further, in the comparing means of other structure, the first comparator is adapted so that when signals of the same potential are inputted to two input terminals of the first comparator, potentials on respective input terminals are unequally set so as to output a signal of high level. Further, the second comparator is adapted so that when signals of the same potential are inputted to two input terminals of the second comparator, potentials on respective input terminals are unequally set so as to output a signal of low level. Thus, the comparing means constituted with these comparators has a hysteresis characteristic.

The detecting means detects a level change point of an output signal from the comparing means to prepare a binary signal. In more practical sense, this detecting means is comprised of a flip-flop circuit adapted to be set by an input of the signal of low level from the first comparator and to be reset by an input of the signal of high level from the second comparator. Thus, a binary signal is prepared on the basis of the level change point of an output signal from the comparing means and is outputted from the detecting circuit.

As stated above, in the CCD solid-state image pick-up apparatus according to this invention, binary circuit connected to the succeeding stage of the charge transfer section by CCD can be constituted by only comparing means and detecting means. Thus, the circuit configuration of the binary circuit is simplified. In addition, binary information can be obtained with high accuracy. Accordingly, it is possible to attain reduction of the number of parts and low power consumption. Further, binary circuit can be formed on the same substrate together with charge transfer section and image pick-up region by CCD. Particularly, in the case where the CCD solid-state image pick-up apparatus according to thins invention is utilized for, e.g., bar code reader, etc., thee bar code reader can become compact and its reliability can be improved.

BRIEF DESCRIPTION OF THE DRAWINGS

FIG. 1 is a circuit diagram showing a binary circuit which is the related art.

FIG. 2 is a diagram showing hysteresis characteristic of the binary circuit which is the related art.

DETAILED DESCRIPTION OF THE PREFERRED EMBODIMENTS

Preferred embodiments in which a binary circuit and a CCD solid-state image pick-up apparatus according to this invention are applied to a binary circuit and a CCD image sensor of a bar code reader (hereinafter respectively referred to as binary circuits according to the embodiments and image sensors according to the embodiments) will now be described with reference to FIGS. 3–30.

Figure 3:
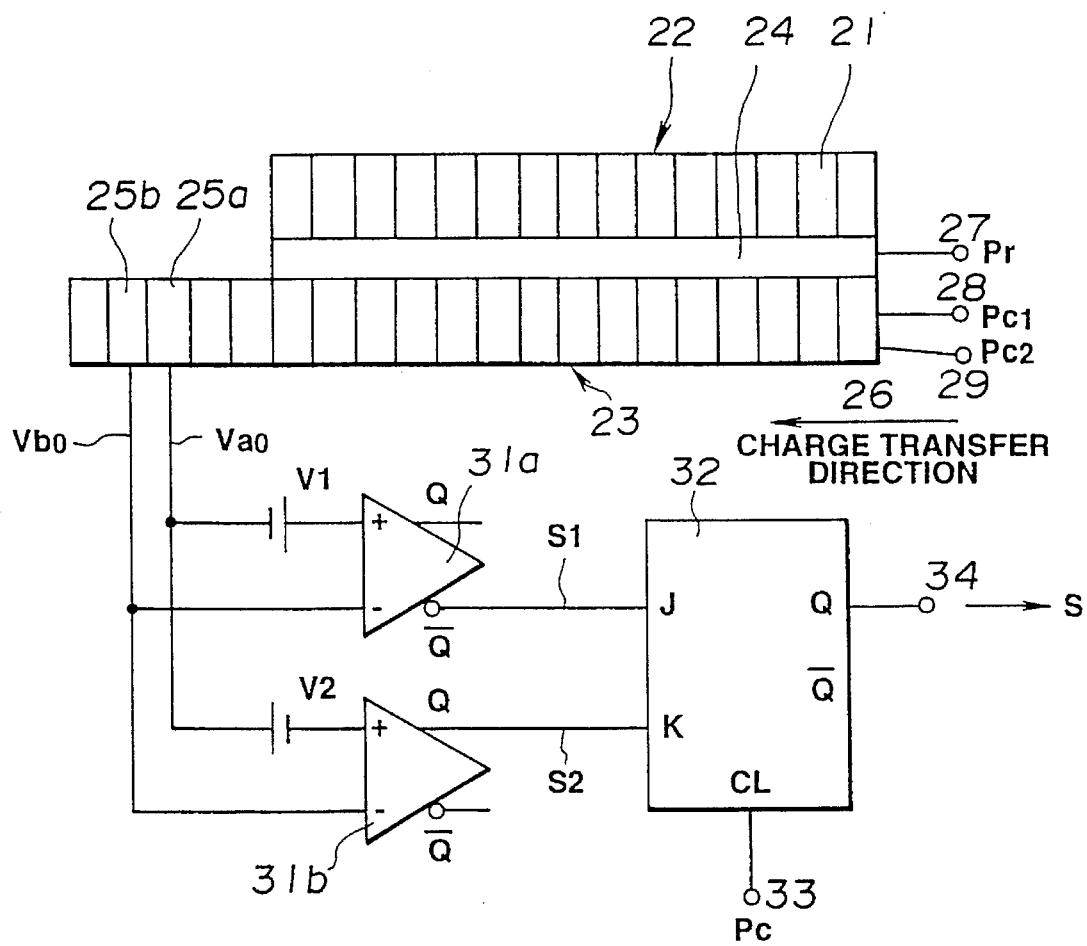
FIG. 3 is a circuit diagram showing the configuration of a first embodiment in which this invention is applied to a binary circuit and a CCD image sensor of a bar code reader (hereinafter respectively referred to as binary circuit according to the embodiment and image sensor according to the embodiment).

An image sensor according to the first embodiment of this invention includes as shown in FIG. 3, an image pick-up region 22 where light receiving sections (pixels) 21 for converting an incident light into a quantity of signal charges corresponding to a light quantity thereof are arranged in line with each other, a charge transfer section 23 by CCD for unidirectionally transferring signal charges from the image pick-up region 22 by application of transfer clocks Pc1, Pc2 to terminals 28, 29, and a readout gate 24 for transferring the signal charges stored in respective pixels 21 in the image pick-up region 22 to the charge transfer section 23 by application of a readout pulse Pr to terminal 27.

Two signal output sections 25a, 25b having quantities of delays from each other as signal output sections at the final stage of the charge transfer section 23 constitute charge voltage converting sections each comprised of a floating gate, and function as electrodes for taking out signal charges which have been transferred from the respective preceding stage as voltage signals (image pick-up signals) $V_{a0}$, $V_{b0}$, respectively. Accordingly, in the following description, two transfer electrodes having quantities of delays different from each other constituting the charge voltage converting section are respectively referred to as a first readout electrode 25a and a second readout electrode 25b.

In this case, second image pick-up signal Vb0 from second readout electrode 25a of first and second image pick-up signals $V_{a0}$, $V_{b0}$ from first and second readout electrodes 25a, 25b is an image pick-up signal in which first image pick-up signal $V_{a0}$ from the first readout electrode 25a is delayed by one bit (i.e. by one transfer clock). Further second image pick-up signal $V_{b0}$ may be an image pick-up signal in which first image pick-up signal $V_{a0}$ is delayed by two bits.

The image sensor according to this embodiment is of a structure such that binary circuit according to the embodiment is connected to the succeeding stages of the first and second readout electrodes 25a, 25b.

The binary circuit according to this embodiment is composed of two comparators, i.e., a first comparator 31a and a second comparator 31b, and a single flip-flop circuit 32. The first and second comparators 31a, 31b are both wired so that first image pick-up signal $V_{a0}$ from first readout electrode 25a is inputted to the respective + side input terminals and second image pick-up signal $V_{b0}$ from second readout electrode 25b is inputted to the respective − side input terminals.

The flip-flop circuit 32 is constructed, in this example, as a JK flip-flop circuit adapted so that transfer clock Pc is delivered to clock terminal CL through terminal 33, and is wired so that a first output signal S1 from first comparator 31a is inputted to J terminal and a second output signal S2 from second comparator 31b is inputted to K terminal. An output signal S of this binary circuit is taken out through terminal 34 from Q terminal of flip-flop circuit 32.

This flip-flop circuit 32 may be of a structure including, e.g., CMOS transistors as the major component, and can be formed on the same substrate along with the image pick-up region 22 and charge transfer section 23 in the image sensor.

In this embodiment, first comparator 31a is constructed for the purpose of obtaining an output when first image pick-up signal $V_{a0}$ is lower than second image pick-up signal $V_{b0}$ in point of potential, and second comparator 31b is constructed for the purpose of obtaining an output when first image pick-up signal $V_{a0}$ is higher than second image pick-up signal $V_{b0}$ in point of potential.

In view of the above in the first comparator 31a, setting is made such that a potential on the + side input terminal is higher than a potential on the − side input terminal by voltage V1 so that an output signal of high level is outputted in the case where signals of the same potential are inputted to the + side input terminal and the − side input terminal. This voltage V1 has an arbitrary voltage and may be obtained by any means, e.g., by connection of power supply, etc. Accordingly, by intentionally allowing potentials on the + side input terminal and the − side input terminal of first comparator 31a to be unbalanced, the first comparator as featured above can be realized.

It is to be noted that when the signal level of first image pick-up signal $V_{a0}$ is Vs–V1, and the signal level of second image pick-up signal $V_{b0}$ is Vs in this first comparator 31a, the output becomes indefinite. In this instance, Vs indicates the signal level of the image pick-up signal.

Various examples of actual circuit configurations in the first comparator 31a will now be described with reference to FIGS. 4 to 14. First, the first example is of a structure comprising, as shown in FIG. 4, as the major components, a RS flip-flop circuit including two n-channel type MOSFETs having drain terminals commonly connected (hereinafter respectively simply referred to as first and second transistors Tr1 and Tr2), and two n-channel type MOSFETs (hereinafter simply referred to as third and fourth transistors Tr3 and Tr4) respectively connected in series to the transistors Tr1 and Tr2, wherein common junction a1 of first and third transistors Tr1, Tr3 is drawn as Q terminal and is connected to the gate electrode of the fourth transistor Tr4; and common junction a2 of second and fourth transistors Tr2, Tr4 is drawn as inverting Q terminal and is connected to the gate electrode of the third transistor Tr3.

In this example, first comparator 31a is of a structure such that a transfer clock generating source 43 is connected to a common drain terminal of first and second transistors Tr1, Tr2; and a power supply 44 having voltage V1 is connected between the gate electrode of first transistor Tr1 and the + side input terminal φ(+) so that positive voltage is applied to the gate electrode In this case, the gate electrode of second transistor Tr2 is drawn as − side input terminal φ(−), and source terminals of third and fourth transistors are grounded.

This first comparator 31a is adapted to take out an output from the inverting Q terminal drawn from common junction a2 of second and fourth transistors Tr2 and Tr4. In this example, power supply 44 is connected to the + side input terminal φ(+), whereby power supply voltage V1 is equivalently added to the level of a signal inputted to the + side input terminal φ(+).

Figure 4:
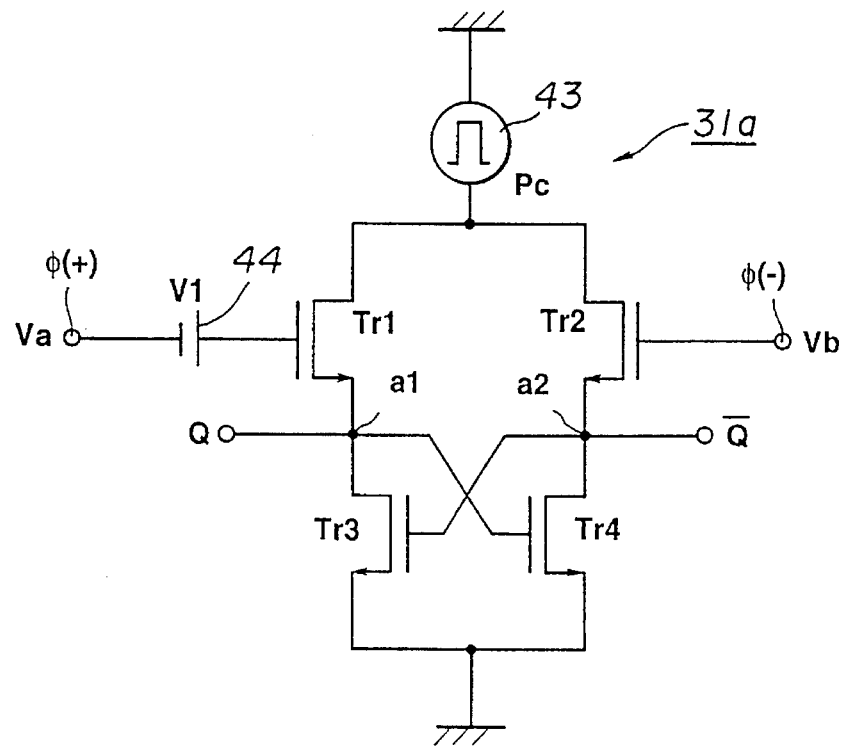
FIG. 4 is a circuit diagram sowing a first example of first comparator constituting the binary circuit according to this embodiment.
Figure 5:
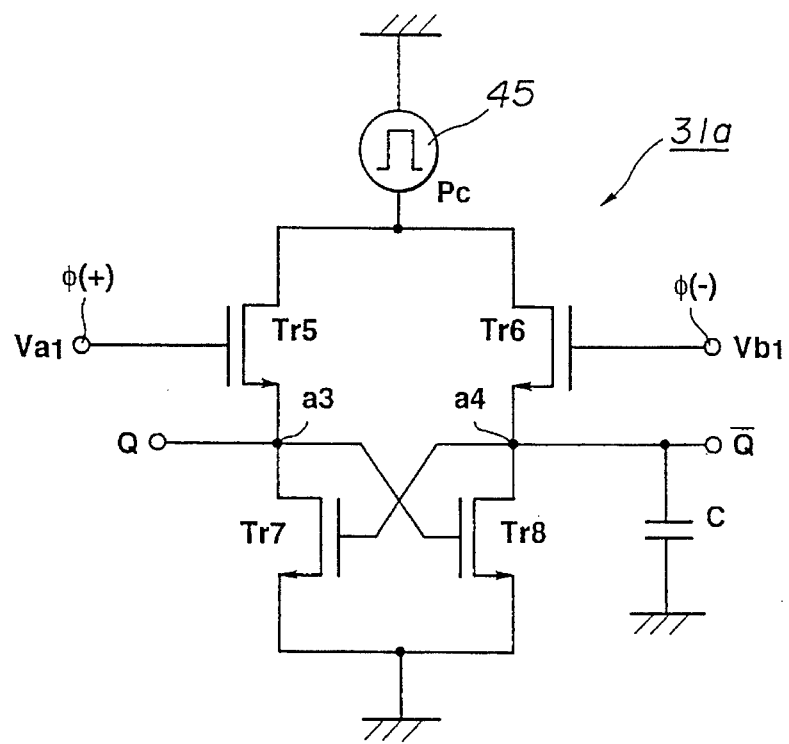
FIG. 5 is a circuit diagram showing a second example of the first comparator constituting the binary circuit according to this embodiment.

The second example of the first comparator 31a has, as shown in FIG. 5, substantially the same configuration as that of the first example shown in FIG. 4, but is characterized in that power supply 44 inserted between + side input terminal φ(+) and the gate electrode of first transistor Tr1 is eliminated and a capacitor C is instead connected between an output line between common junction a4 of second and fourth transistors Tr6 and Tr8 and the inverting Q terminal and the ground. In this example, the threshold voltage of the second transistor Tr6 is caused to be higher by charges stored in the capacitor C.

Namely, respective threshold voltages of first transistor Tr5 supplied with first image pick-up signal $V_{a1}$ and second transistor Tr6 supplied with second image pick-up signal $V_{b1}$ are caused to be unbalanced. As a result, power supply voltage V1 corresponding to the threshold voltage added to the second transistor Tr6 is equivalently added to the level of a signal inputted to the + side input terminal φ(+).

Figure 6:
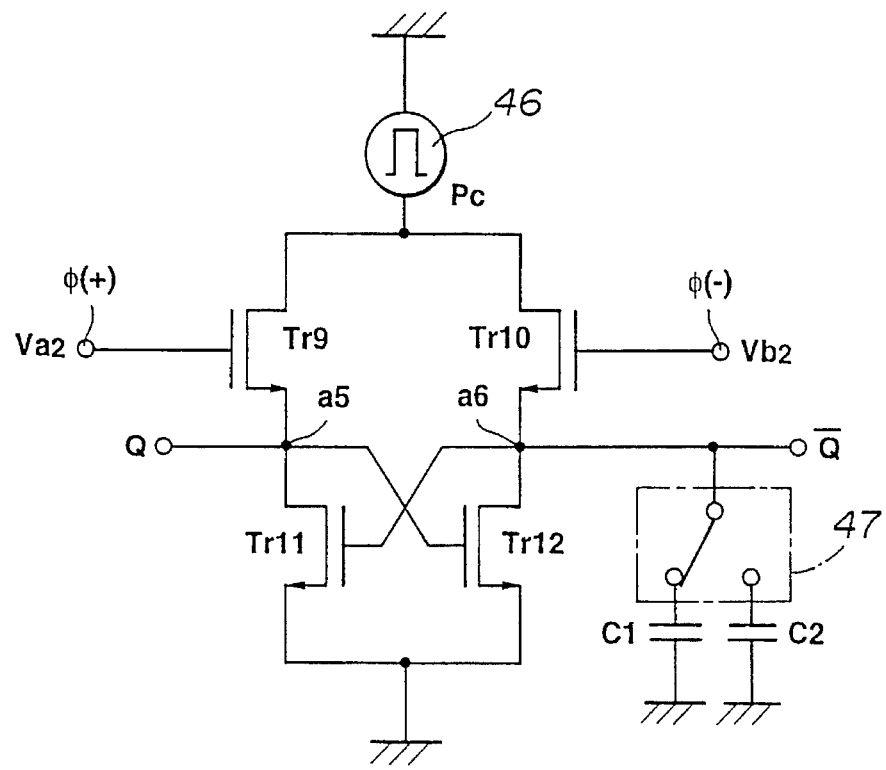
FIG. 6 is a circuit diagram showing a modification of the second example of the first comparator constituting the binary circuit according to this embodiment.

As a modification of the second example, there may be employed, as shown in FIG. 6, a configuration such that a plurality of capacitors $C_1$ and $C_2$ having capacitance values different from each other are formed and output line side terminals of respective capacitors $C_1$ and $C_2$ and the output line are selectively connected by means of a switching circuit 47. In this case, switching circuits 47 may be constituted with a switch such that, for example, equivalently, output line side terminals of respective capacitors $C_1$ and $C_2$ are caused to be a fixed contact and the output line is caused to be a movable contact. In the case of forming the above-described switching circuit 47 on the same substrate together with the image sensor, it may be easily formed by, e.g., a plurality of n-channel type MOSFETs.

Figure 7:
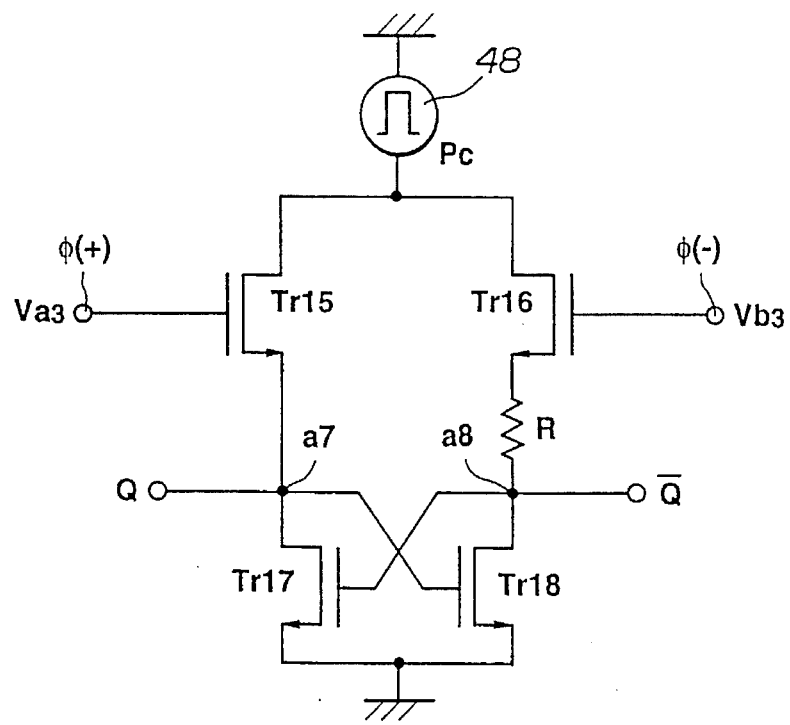
FIG. 7 is a circuit diagram showing a third example of the first comparator constituting the binary circuit according to this embodiment.

The third example of the first comparator 31a has, as shown in FIG. 7, substantially the same configuration as that of the first example shown in FIG. 4, but is characterized in that power supply 44 inserted between the + side input terminal φ(+) and the gate electrode of the first transistor Tr1 is eliminated and a resistor R is instead inserted between common junction a8 of second and fourth transistors Tr16 and Tr18 and the second transistor Tr16.

Also in this example, respective threshold voltages of first transistor Tr15 supplied with first image pick-up signal $V_{a3}$ and second transistor Tr16 supplied with second image pick-up signal $V_{b3}$ resultantly become unbalanced. Thus power supply voltage V1 corresponding to the threshold voltage added to the second transistor Tr16 is equivalently added to the level of a signal inputted to the + side input terminal φ(+).

Figure 8:
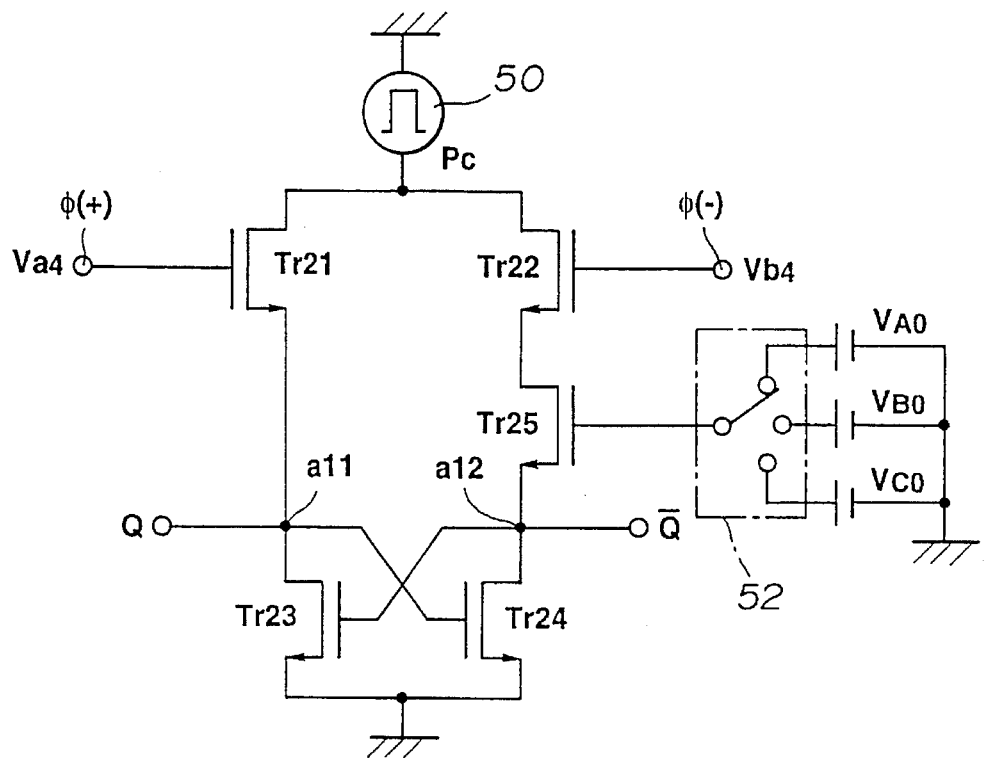
FIG. 8 is a circuit diagram showing a modification of the third example of the first comparator constituting the binary circuit according to this embodiment.

As a modification of the third example, there may be employed, as shown in FIG. 8, a configuration such that a transistor Tr25 comprised of, e.g., n-channel type MOSFET is inserted as resistor, and plurality of power supplies $V_{A0}$, $V_{B0}$, $V_{C0}$ having voltage levels different from each other are selectively connected to the gate electrode of this transistor Tr25 through switching circuit 52. In this case, switching circuit 52 may be constituted with a switch such that, for example, equivalently, output terminals of respective power supplies $V_{A0}$, $V_{B0}$, $V_{C0}$ are caused to be a fixed contact and the gate electrode of transistor Tr25 is caused to be a movable contact. In the case of forming the switching circuit 52 on the same substrate along with the image sensor it may be easily formed by, e.g., a plurality of n-channel type MOSFETs.

Figure 9:
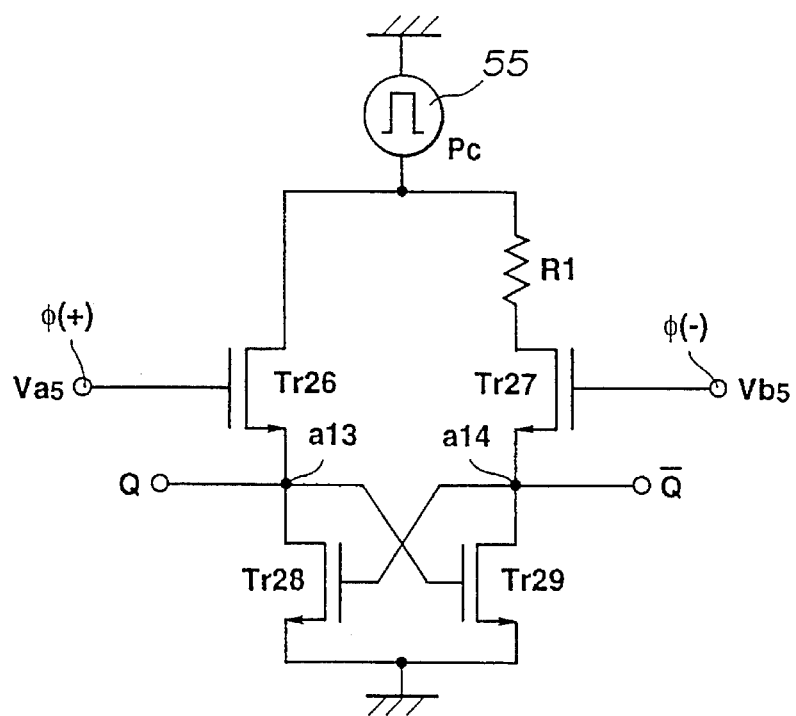
FIG. 9 is a circuit diagram showing a fourth example of the first comparator constituting the binary circuit according to this embodiment.

The fourth example of the first comparator has, as shown in FIG. 9, substantially the same configuration as that of the third example shown in FIG. 7, but differs from the latter in that resistor R1 is inserted on the drain side of second transistor Tr27. Also in this example, respective threshold voltages of first transistor Tr26 supplied with first image pick-up signal $V_{a5}$ and second transistor Tr27 supplied with second image pick-up signal $V_{b5}$ resultantly become unbalanced. Thus, power supply voltage V1 corresponding to the threshold voltage added to the second transistor Tr27 is equivalently added to the level of a signal inputted to the + side input terminal φ(+).

Figure 10:
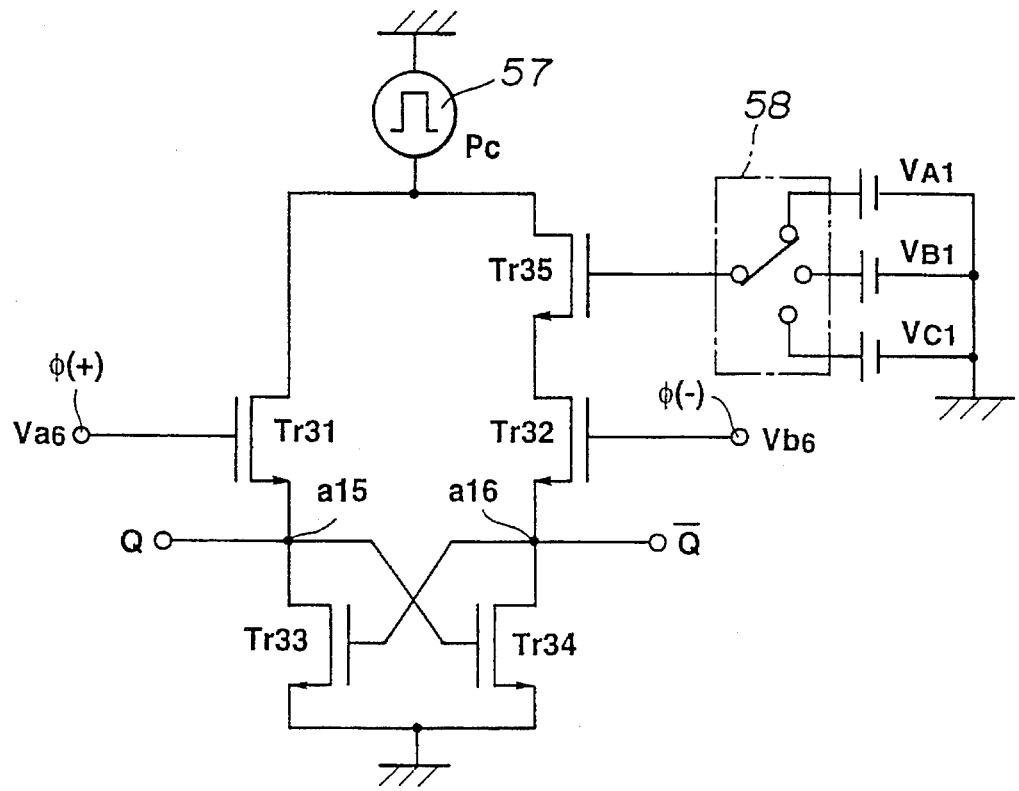
FIG. 10 is a circuit diagram showing a modification of the fourth example of the first comparator constituting the binary circuit according to this embodiment.

As a modification of the fourth example, there may be employed, as shown in FIG. 10, a configuration such that, similarly to the modification of the third example shown in FIG. 8, a transistor Tr35 comprised of, e.g., n-channel MOSFET is inserted as resistor R1 and a plurality of power supplies $V_{A1}$, $V_{B1}$, $V_{C1}$ having levels different from each other are selectively connected to the gate electrode of the transistor Tr35 through a switching circuit 58.

Figure 11:
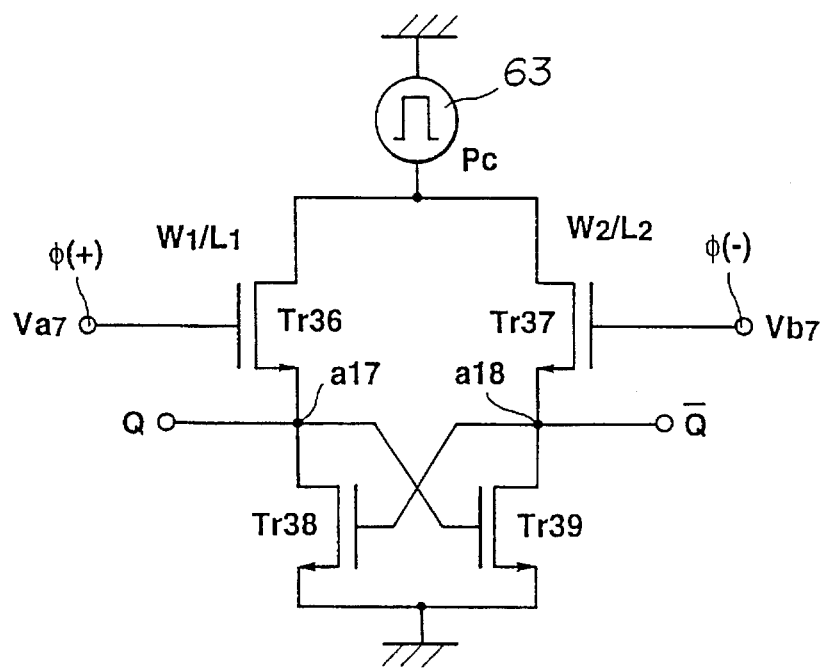
FIG. 11 is a circuit diagram showing a fifth example of the first comparator constituting the binary circuit according to this embodiment.

The fifth example of the first comparator has, as shown in FIG. 11, substantially the same configuration as that of the first example shown in FIG. 4, but is characterized in that power supply 44 inserted between the + side input terminal φ(+) and the gate electrode of first transistor Tr1 is eliminated, and a ratio $W_1/L_1$ between channel width $W_1$ and channel length $L_1$ in the first transistor Tr36 and a ratio $W_2/L_2$ between channel width $W_2$ and channel length $L_2$ in the second transistor Tr37 are intentionally changed so that respective threshold voltages of first transistor Tr36 supplied with first image pick-up signal $V_{a7}$ and second transistor Tr37 supplied with second image pick-up signal $V_{b7}$ are caused to be unbalanced. Also in this example, power supply voltage V1 corresponding to the threshold voltage added to second transistor Tr37 is resultantly equivalently added to the level of a signal inputted to the + side input terminal φ(+).

Figure 12:
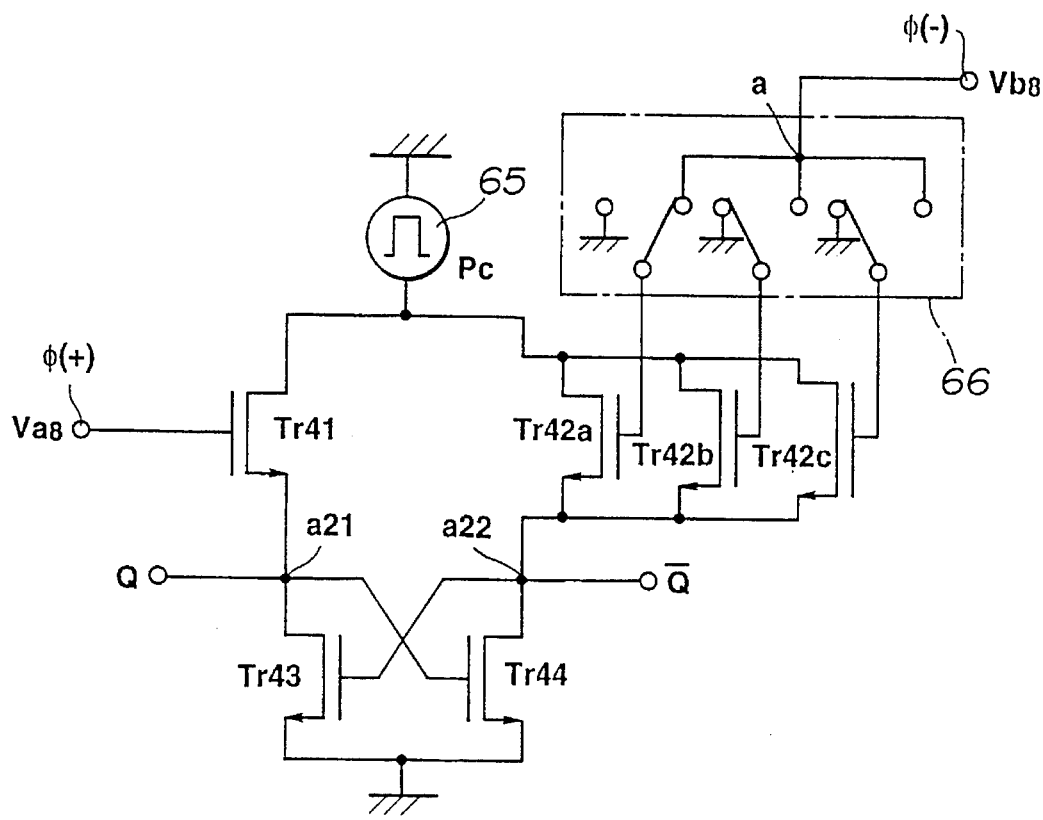
FIG. 12 is a circuit diagram showing a modification of the fifth example of the first comparator constituting the binary circuit according to this embodiment.

As a modification of the fifth example there may be employed, as shown in FIG. 12, a configuration such that a plurality of transistors (each comprised of an n-channel type MOSFET) Tr42a, Tr42b and Tr42c having ratios W/L between channel widths W and channel lengths L different from each other and having drain terminals and source terminals respectively commonly connected are formed in place of second transistor Tr37, and gate electrodes of respective transistors Tr42a, Tr42b and Tr42c and the − side input terminal φ(−) are selectively connected by means of a switching circuit 66.

In this case, switching circuit 66 may be constituted with a plurality of switches such that, for example, equivalently, gate electrodes of respective transistors 42a, 42b and 42c are caused to be a movable contact, the ends extended from the − side input terminal φ(−) toward respective movable contact sides through the common junction a are caused to be respectively first fixed contacts, and the ends extended from the ground line toward respective movable contact sides are caused to be respectively second fixed contacts. In the case of forming the switching circuit 66 on the same substrate along with the image sensor, it may be easily formed by, e.g., a plurality of n-channel type MOSFETs.

Figure 13:
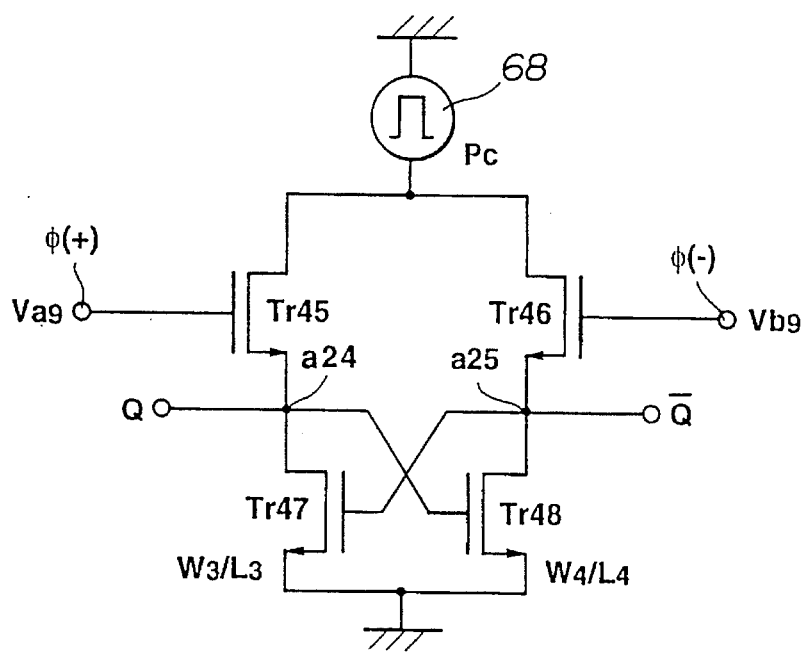
FIG. 13 is a circuit diagram showing a sixth example of the first comparator constituting the binary circuit according to this embodiment.

The sixth example of the first comparator has, as shown in FIG. 13, substantially the same configuration as that of the first example shown in FIG. 4, but is characterized in that power supply 44 inserted between the + side input terminal φ(+) and the gate electrode of first transistor Tr1 is eliminated, and a ratio $W_3/L_3$ between channel width $W_3$ and channel length $L_3$ in third transistor 47 and a ratio $W_4/L_4$ between channel width $W_4$ and channel length $L_4$ in fourth transistor 48 are caused to be instead intentionally varied so that respective threshold voltages of first transistor Tr45 supplied with first image pick-up signal $V_{a9}$ and second transistor Tr46 supplied with second image pick-up signal $V_{b9}$ are caused to be unbalanced. Also in this example, power supply voltage V1 corresponding to the threshold voltage added to second transistor 46 is resultantly equivalently added to the level of a signal inputted to the + side input terminal φ(+).

Figure 14:
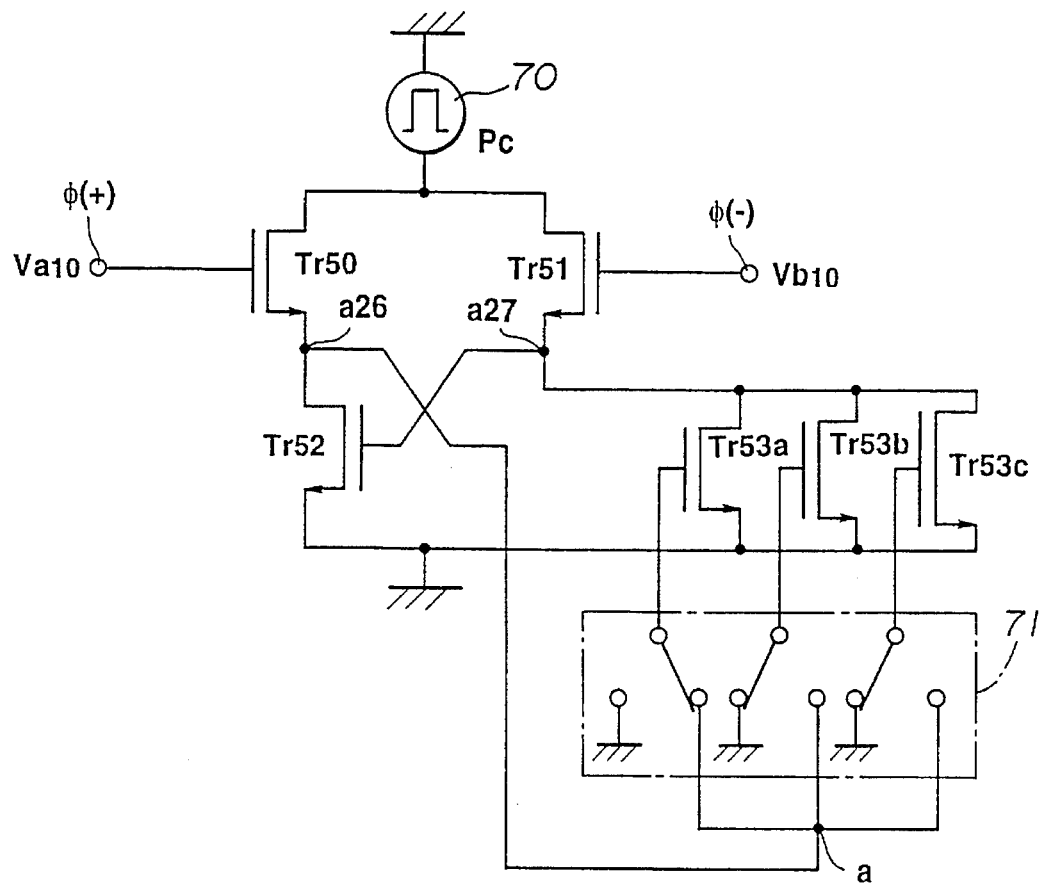
FIG. 14 is a circuit diagram showing a modification of the sixth example of the first comparator constituting the binary circuit according to this embodiment.

As a modification of the sixth example, there may be employed, as shown in FIG. 14, a configuration such that a plurality of transistors (each comprised of an n-channel type MOSFET) Tr53a, Tr53b and Tr53c having ratios W/L between channel widths W and channel lengths L different from each other and having drain terminals and source terminals respectively commonly connected are formed in place of fourth transistor Tr4, and gate electrodes of respective transistors Tr53a, Tr53b and Tr53c and the − side input terminal φ(−) are selectively connected by means of a switching circuit 71.

In this case, the switching circuit 71 may be constituted with a plurality of switches such that, for example, equivalently, gate electrodes of respective transistors Tr53a, Tr53b and Tr53c are caused to be respectively movable contacts, the ends extended from common junction a26 between first and third transistors Tr50 and Tr52 toward respective movable contact sides through common junction a are caused to be respectively first fixed contacts, and the ends extended from the ground line toward respective movable contact sides are caused to be respectively second fixed contacts. In the case of forming the switching circuit 71 on the same substrate along with the image sensor, it may be easily formed by, e.g., a plurality of n-channel type MOSFETs.

On the other hand, in the second comparator 31b, as shown in FIG. 3, setting is made such that a potential on the + side input terminal φ(+) is caused to be lower by voltage V2 than a potential on the − side input terminal φ(−) so that an output signal of low level is outputted when signals of the same potential are inputted to the + side input terminal φ(+) and the − side input terminal φ(−). Also in this case, similarly to the comparator 31a, the voltage V2, has an arbitrary voltage value and may obtained by any means, e.g., by connection of power supply, etc. Accordingly, such a setting can be realized by allowing potentials on the + side input terminal φ(+) and the − side input terminal φ(−) to be intentionally unbalanced. It is to be noted that when the signal level of first image pick-up signal $V_{a0}$ is Vs +V2, and the signal level of second image pick-up signal $V_{b0}$ is Vs, an output of the second comparator 31b becomes indefinite.

Figure 15:
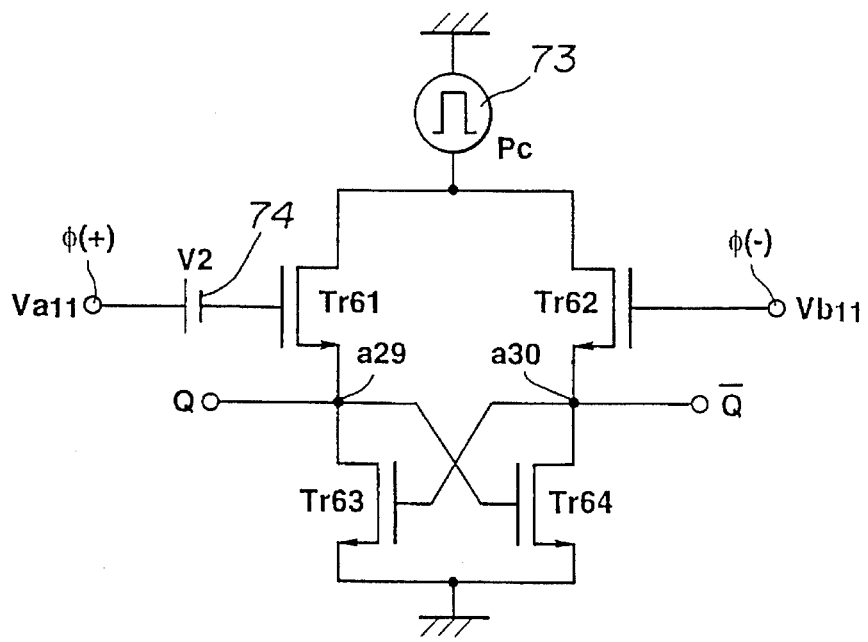
FIG. 15 is a circuit diagram showing a first example of second comparator constituting the binary circuit according to this embodiment.

Various examples of actual circuit configurations in the second comparator 31b will now be described with reference to FIGS. 15–25. The first example has, as shown in FIG. 15, substantially the same configuration as that of the first example in the first comparator 31a shown in FIG. 4, but differs from the latter in that second comparator 31b is of a structure such that power supply 74 having voltage V2 is connected between the gate electrode of first transistor 61 and the + side input terminal φ(+) so that negative voltage is applied to the gate electrode. The second comparator 31b is adapted to take out an output from Q terminal drawn from the common junction a29 of first and third transistors Tr61 and Tr63. In this example, negative power supply 74 is connected to the + side input terminal φ(+), whereby power supply voltage V2 is equivalently subtracted from the level of a signal inputted to the + side input terminal φ(+).

Figure 16:
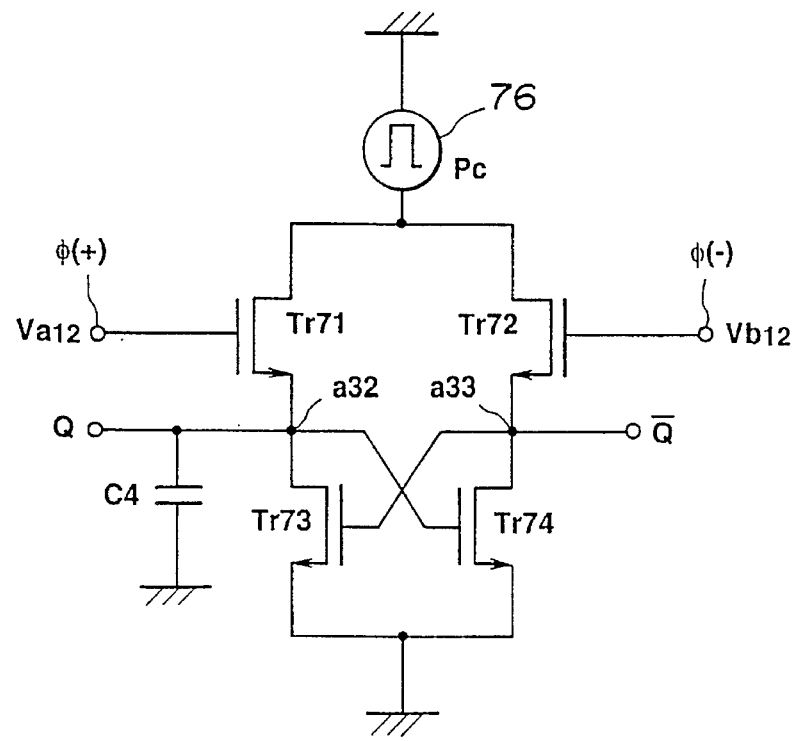
FIG. 16 is a circuit diagram showing a second example of the second comparator constituting the binary circuit according to this embodiment.

The second example of the second comparator 31b has, as shown in FIG. 16, substantially the same configuration as that of the second example of the first comparator 31a shown in FIG. 5, but differs from the latter in that a capacitor $C_4$ is connected between the output line between common junction a32 of first and third transistors Tr71 and Tr73 and Q terminal and the ground. In this example, the threshold value of the first transistor Tr71 is caused to be higher by charges stored in the capacitor $C_4$. Namely, respective threshold voltages of first transistor Tr71 supplied with first image pick-up signal $V_{a12}$ and second transistor Tr72 supplied with second image pick-up signal $V_{b12}$ are caused to be unbalanced. As a result, power supply voltage V2 corresponding to the threshold voltage added to the first transistor Tr71 is equivalently subtracted from the level of a signal inputted to the + side input terminal φ(+).

Figure 17:
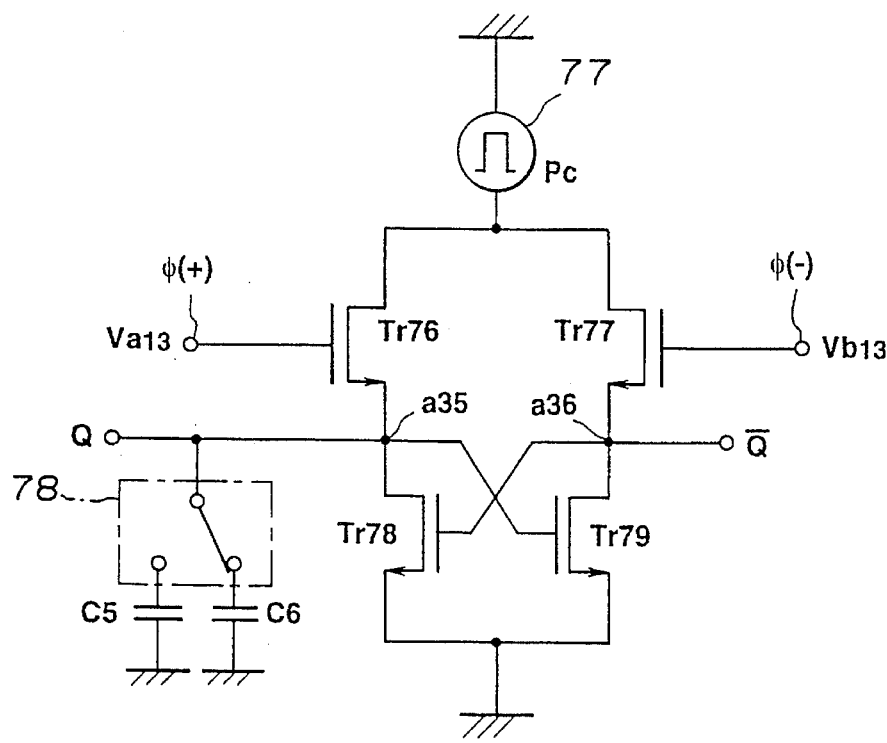
FIG. 17 is a circuit diagram showing a modification of the second example of the second comparator constituting the binary circuit according to this embodiment.

As a modification of the second example there may be employed, as shown in FIG. 17, a configuration such that, similarly to the modification of the second example in the first comparator 31a shown in FIG. 6, a plurality of capacitors $C_5$ and $C_6$ having capacitance values different from each other are formed, and the output line side terminals of respective capacitors $C_5$ and $C_6$ and the output line are selectively connected by means of a switching circuit 78.

Figure 18:
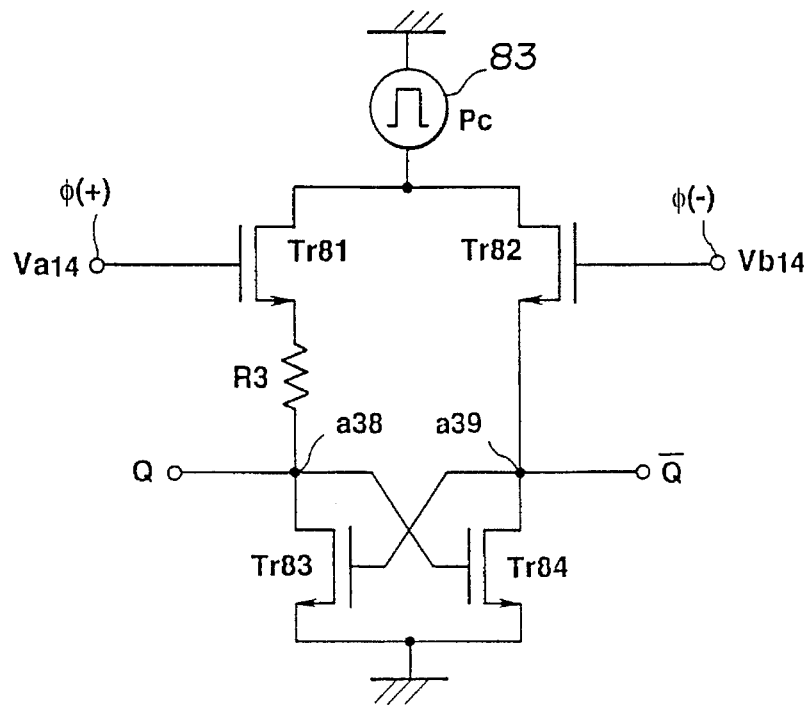
FIG. 18 is a circuit diagram showing a third example of the second comparator constituting the binary circuit according to this embodiment.

The third example of the second comparator has, as shown in FIG. 18, substantially the same configuration as that of the third example in the first comparator 31a shown in FIG. 7, but differs from the latter in that a resistor R3 is inserted between common junction a7 of first and third transistors Tr81 and Tr83 and first transistor Tr81. Also in this example, respective threshold voltages of first and second transistors Tr81 and Tr82 are caused to be resultantly unbalanced. Thus, power supply voltage V2 corresponding to the threshold voltage added to the first transistor Tr81 is equivalently subtracted from the level of a signal inputted to the + side input terminal φ(+).

Figure 19:
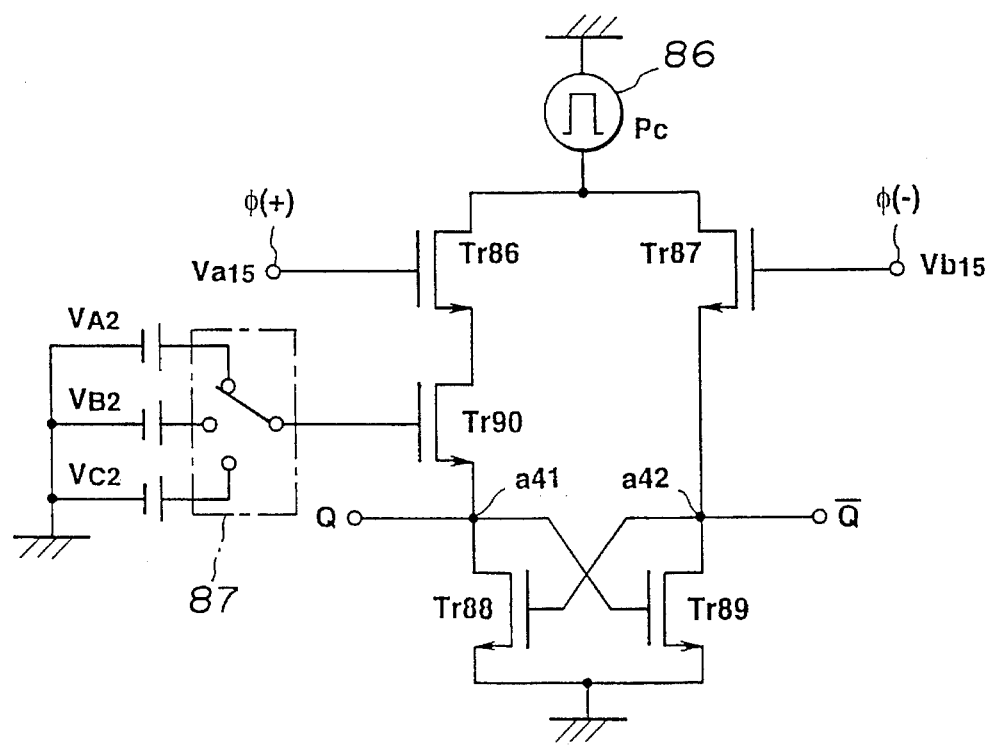
FIG. 19 is a circuit diagram showing a modification of the third example of the second comparator constituting the binary circuit according to this embodiment.

As a modification of the third example, there may be employed, as shown in FIG. 19, a configuration such that, similarly to the modification of the third example in the first comparator 31a shown in FIG. 8, a transistor Tr90 comprised of, e.g., an n-channel type MOSFET is inserted as resistor R3, and a plurality of power supplies $V_{A2}$, $V_{B2}$, $V_{C2}$ having voltage levels different from each other are selectively connected to the gate electrode of the transistor Tr90 through a switching circuit 87.

Figure 20:
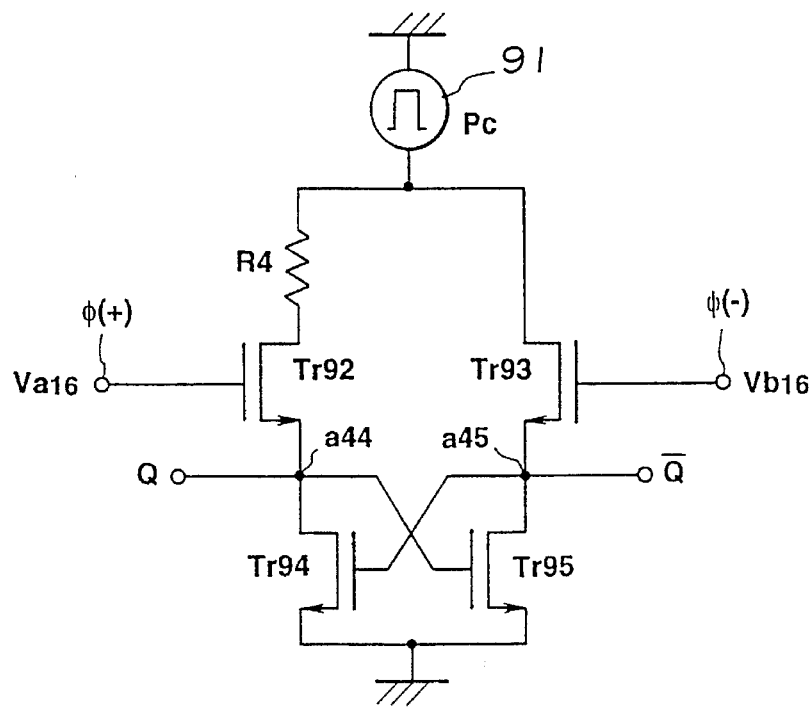
FIG. 20 is a circuit diagram showing a fourth example of the second comparator constituting the binary circuit according to this embodiment.

The fourth example of the second comparator 31b has, as shown in FIG. 20, substantially the same configuration as that of the third example in the first comparator 31a shown in FIG. 9, but differs from the latter in that a restor $R_4$ is inserted on the drain side of the first transistor Tr92. Also in this example, respective threshold voltages of first and second transistors Tr92 and Tr93 are caused to be resultantly unbalanced. Thus, power supply voltage V2 corresponding to the threshold voltage added to the first transistor Tr92 is equivalently subtracted from the level of a signal inputted to the + side input terminal φ(+).

Figure 21:
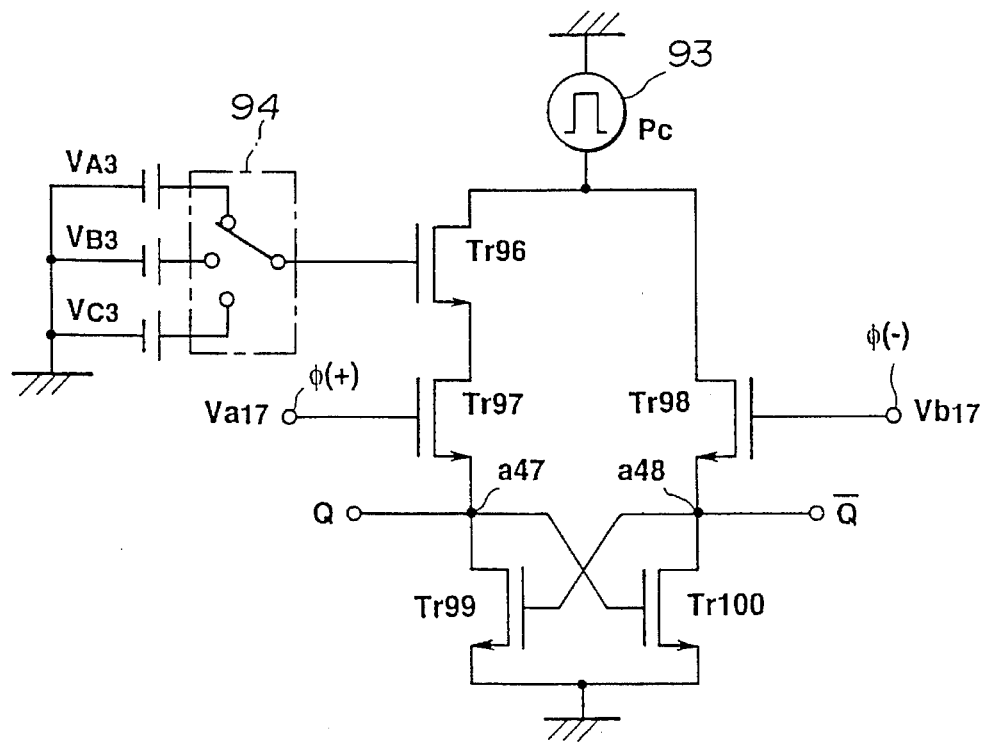
FIG. 21 is a circuit diagram showing a modification of the fourth example of the second comparator constituting the binary circuit according to this embodiment.

As a modification of the fourth example, there may be employed, as shown in FIG. 21, a configuration such that, similarly to the modification of the fourth example in the first comparator 31a shown in FIG. 10, a transistor Tr96 comprised of, e.g., n-channel type MOSFET is inserted in place of resistor R4 of FIG. 20, and a plurality of power supplies $V_{A3}$, $V_{B3}$ and $V_{C3}$ having voltage levels different from each other are selectively connected to the gate electrode of the transistor Tr96 through a switching circuit 94

Figure 22:
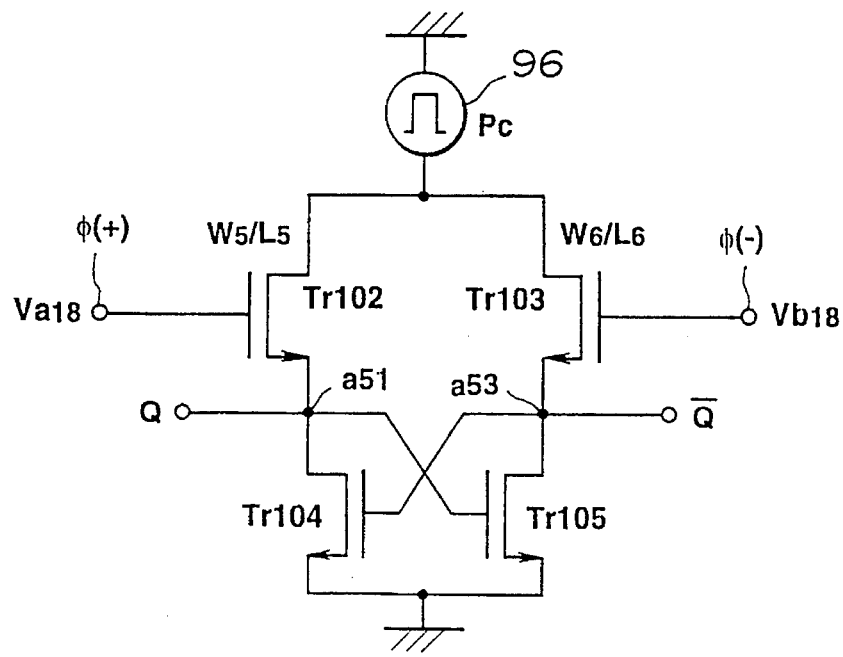
FIG. 22 is a circuit diagram showing a fifth example of the second comparator constituting the binary circuit according to this embodiment.

The fifth example of the second comparator 31b has, as shown in FIG. 22, substantially the same configuration as that of the fifth example in the first comparator shown in FIG. 11, but differs from the latter in that a ratio $W_5/L_5$ between channel width $W_5$ and channel length $L_5$ in the first transistor Tr102 and a ratio $W_6/L_6$ between channel width W6 and channel length L6 in the second transistor Tr103 are caused to be intentionally varied so that power supply voltage V2 corresponding to the threshold voltage added to the first transistor Tr102 is equivalently subtracted from the level of a signal inputted to the + side input terminal φ(+).

Figure 23:
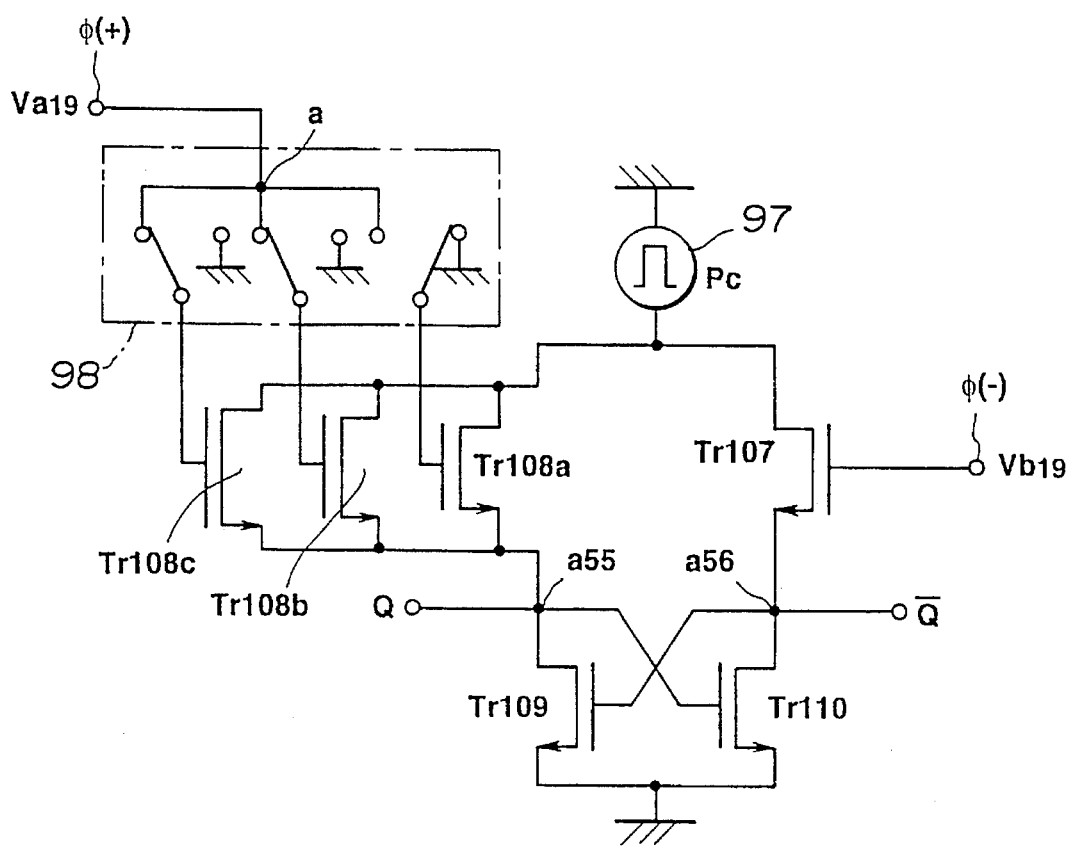
FIG. 23 is a circuit diagram showing a modification of the fifth example of the second comparator constituting the binary circuit according to this embodiment.

As a modification of the fifth example, there may be employed, as shown in FIG. 23, a configuration such that, similarly to the modification of the fifth example in the first comparator 31a shown in FIG. 12, a plurality of transistors (each comprised of an n-channel type MOSFET) Tr108a, Tr108b, Tr108c having ratios W/L between channel widths W and channel lengths L different from each other and drain terminals and source terminals respectively commonly connected are formed in place of first transistor Tr41, and gate electrodes of respective transistors Tr108a, Tr108b, Tr108c and the − side input terminal φ(−) are selectively connected by a switching circuit 98.

Figure 24:
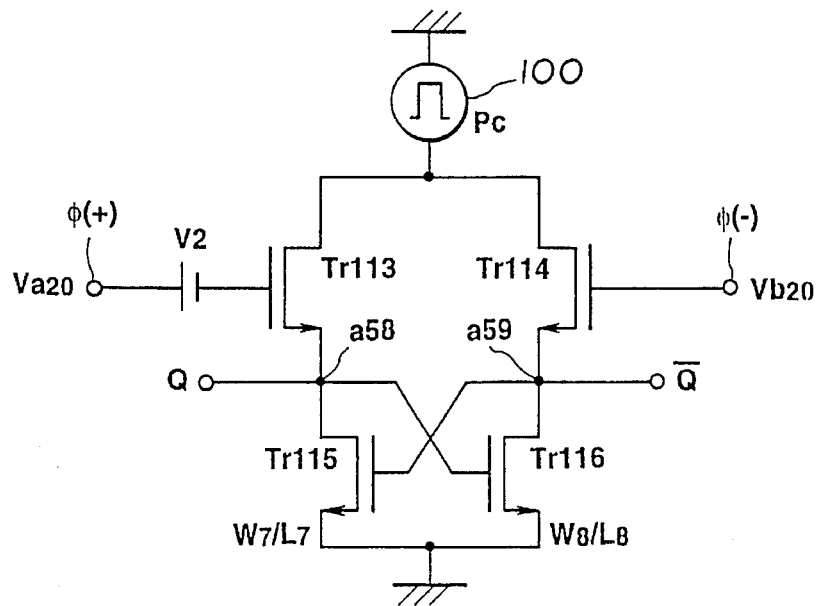
FIG. 24 is a circuit diagram showing a sixth example of the second comparator constituting the binary circuit according to this embodiment.

The sixth example of the second comparator has, as shown in FIG. 24, substantially the same configuration as that of the sixth example in the first comparator 31a shown in FIG. 13, but differs from the latter in that a ratio $W_7/L_7$ between channel width $W_7$ and channel length $L_7$ in the third transistor Tr115 and a ratio $W_8/L_8$ between channel width $W_8$ and channel length $L_8$ in the fourth transistor Tr116 are caused to be intentionally varied so that power supply voltage V2 corresponding to the threshold voltage added to the first transistor Tr113 is equivalently subtracted from the level of a signal inputted to the + side input terminal φ(+).

Figure 25:
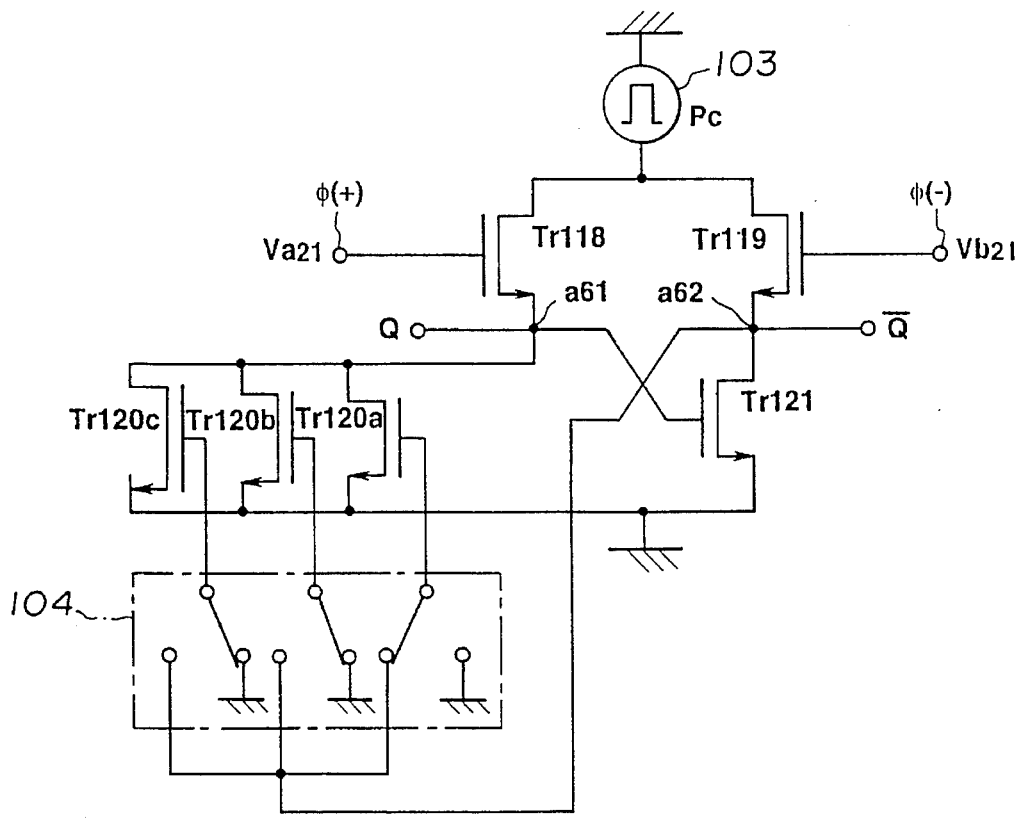
FIG. 25 is a circuit diagram showing a modification of the sixth example of the second comparator constituting the binary circuit according to this embodiment.

As a modification of the sixth example, there may be employed, as shown in FIG. 25, a configuration such that, similarly to the modification of the sixth example in the first comparator 31a shown in FIG. 15, a plurality of transistors (each comprised of an n-channel type MOSFET) Tr120a, Tr120b, Tr120c having ratios W/L between channel widths W and channel lengths L different from each other and drain terminals and source terminals respectively commonly connected are formed in place of third transistor Tr63, and gate electrodes of respective transistors Tr120a, Tr120b, Tr120c and the − side input terminal φ(−) are selectively connected by means of a switching circuit 104.

The signal processing operation of the binary circuit according to the embodiment will now be described with reference to the timing chart of FIG. 26.

In FIG. 3, signal waveform of second image pick-up signal $V_{b0}$ outputted from second readout electrode 25b is signal waveform delayed by one bit (i.e., one transfer clock) relative to signal waveform of first image pick-up signal $V_{a0}$ outputted from first readout electrode 25a adjacent at the preceding stage thereof. In these image pick-up signals $V_{a0}$ and $V_{b0}$, period $T_b$ indicates black information, and period $T_w$ indicates white information.

The waveform of first output signal (output signal from the inverting Q terminal of first comparator 31a) S1 outputted from the first comparator 31a is caused to be at high level when the signal level of first image pick-up signal $V_{a0}$ drops by more than voltage V1 relative to the signal level of second image pick-up signal $V_{b0}$, and is caused to be at low level when otherwise.

On the other hand, the waveform of second output signal (output signal from Q terminal of second comparator 31b) outputted from the second comparator 31b is caused to be at high level when the signal level of second image pick-up signal $V_{b0}$ is caused to be higher by mare than voltage V2 relative to the signal level of first image pick-up signal $V_{a0}$, and is caused to be at low level when otherwise.

Output signal S from K flip-flop circuit 32 has a signal waveform such that it rises at the time point when output signal S1 from the first comparator 31a is caused to be at high level and transfer clock signal Pc falls, and it falls at the time when output signal S2 from the second comparator 31b is caused to be at high level and transfer clock signal Pc falls. Namely, the output of the JK flip-flop circuit 32 is determined in dependency upon the levels of signals S1 and S2 inputted to the J terminal and the K terminal at the time point when transfer clock signal Pc falls.

It is seen that white and block corresponding to information which have been read in image pick-up region 22 of the image sensor can be discriminated with high accuracy from the signal waveform of output signal S outputted from the JK flip-flop circuit 32 and signal waveforms of first and second image pick-up signals $V_{a0}$ and $V_{b0}$.

Figure 27:
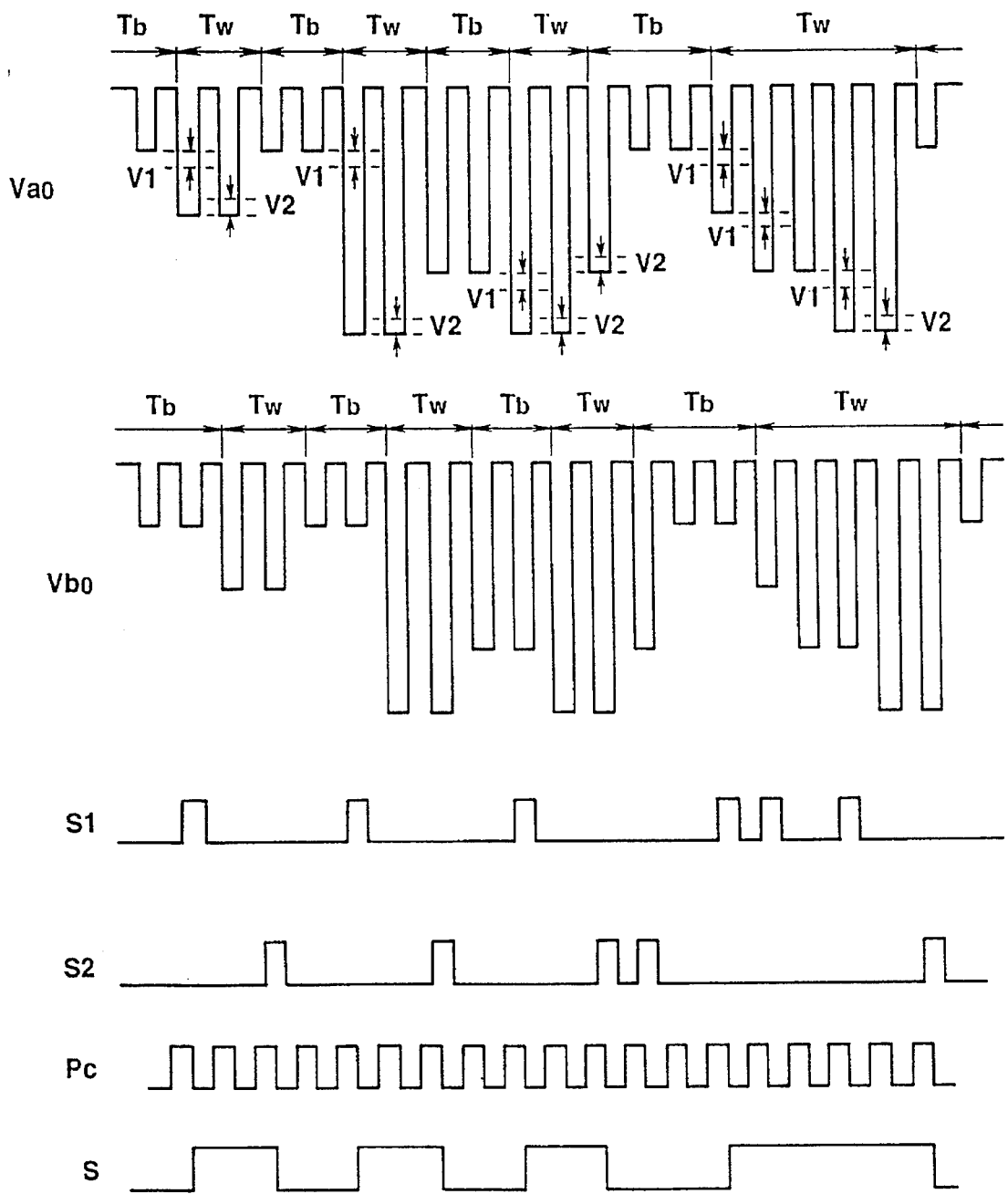
FIG. 27 is a timing chart showing the signal processing operation of the binary circuit according to this embodiment in the case where information read by the image sensor according to this embodiment is caused to undergo level change to much degree.

Further, also in the case where information read by the image sensor is caused to undergo level change to much degree by the influence of unevenness of the surface of a medium (manuscript, etc.) on which bar codes are printed, or light source or for any other reason, as shown in the timing chart of FIG. 27, in the time period Tw at which information is read as white information, output signal S from the JK flip-flop circuit 32 is caused to be at high level, and in the period Tb at which information is read as black information, output signal S from the JK flip-flop circuit S2 is caused to be at low level. Thus, it is seen that white and black corresponding to information which have been read in the image pick-up region 22 of the image sensor can be discriminated with high accuracy.

Other embodiments of the image sensor and the binary circuit according to this invention will now be described with reference to FIGS. 28 to 30.

Figure 28:
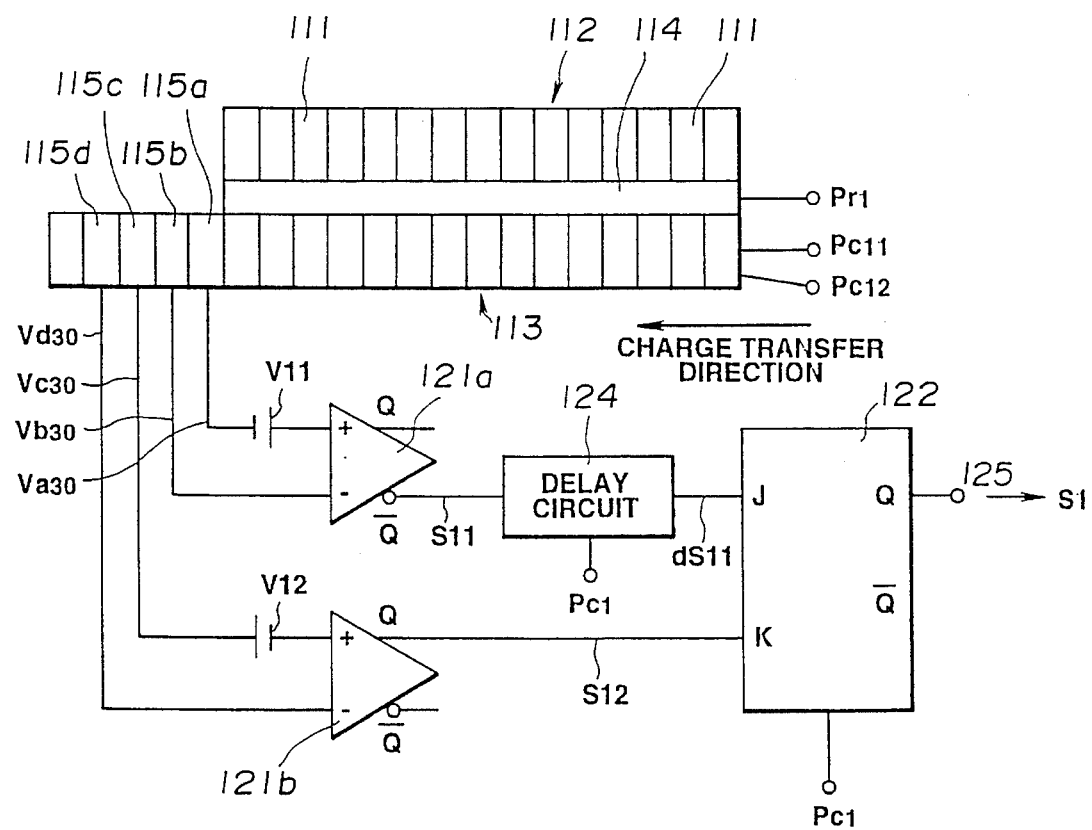
FIG. 28 is a circuit diagram showing the configuration of an image sensor and a binary circuit according to this invention.

FIG. 28 shows an image sensor and a binary circuit according to the second embodiment. The image sensor and the binary circuit according to the second embodiment have substantially the same configuration as those of the image sensor and the binary circuit according to the first embodiment shown in FIG. 3, but differs from the latter as follows. Namely, the second embodiment differs from the first embodiment in that readout electrodes adjacent to each other which are formed in the final stage in charge transfer section 113 of the image sensor are caused to be respectively adjacent four readout electrodes (hereinafter referred to as first, second, third and fourth readout electrodes 115a, 115b, 115c and 115d from the preceding stage side for convenience); that first image pick-up signal $V_{a30}$ from first readout electrode 115a is inputted to the + side input terminal of first comparator 121a and second image pick-up signal $V_{b30}$ from second readout electrode 115b is inputted to the − side input terminal of the first comparator 121a; that third image pick-up signal $V_{c30}$ from third readout electrode 115c is inputted to the + side input terminal of second comparator 121b and fourth image pick-up signal $V_{d30}$ from fourth readout electrode 115d is inputted to the − side input terminal of the second comparator 121b; and that delay circuit 124 for delaying data by two transfer clocks is inserted between inverting Q terminal of first comparator 121a and J terminal of JK flip-flop circuit 122. This delay circuit 124 aims at allowing output timings of output signal S11 from first comparator 121a and output signal S12 from second comparator 121b to be in correspondence with each other.

Also in the second embodiment, similarly to the first embodiment, setting is made such that a potential on the + side input terminal in the first comparator 121a is caused to be higher than a potential on the − side input terminal by voltage V11, and setting is made such that a potential on the + side input terminal in the second comparator 121b is caused to be lower than a potential on the − side terminal by voltage V12.

Further, a pair of first and second image pick-up signals $V_{a30}$ and $V_{b30}$ are inputted to first comparator 121a, and a pair of third and fourth image pick-up signals $V_{c30}$ and $V_{d30}$ are inputted to second comparator 121b. In addition, output timings of output signal S1 from first comparator 121a and output signal S12 from second comparator 121b are caused to be in correspondence with each other at delay circuit 124 connected at the succeeding stage of first comparator 121a, and are respectively delivered to the J terminal and the K terminal of JK flip-flop circuit 122.

Figure 26:
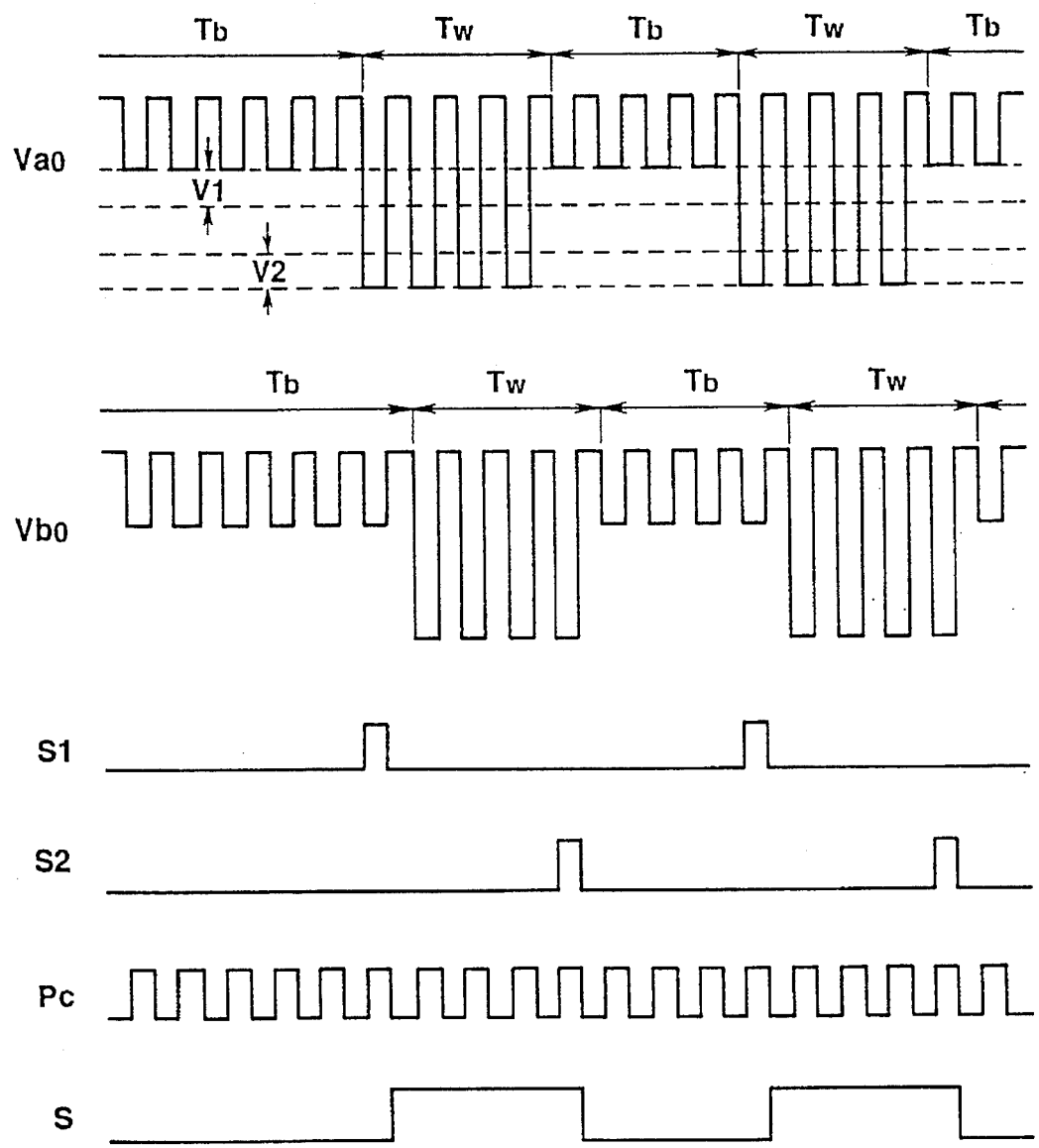
FIG. 26 is a timing chart showing the signal processing operation of the binary circuit according to this embodiment.

In the second embodiment, output signal dS11 from delay circuit 124 and output signal S12 from second comparator 121a respectively correspond to, output signals S1 and S2 in the timing charts of FIGS. 26 and 27, and output signal S1 from Q terminal 125 of JK flip-flop circuit 122 corresponds to output signal S in the timing charts of FIGS. 26 and 27.

Accordingly, also in the second embodiment similarly to the first embodiment, white and black corresponding to information which have been read in image pick-up region 112 of the image sensor can be discriminated with high accuracy. Particularly, in the first modification, respective image pick-up signals $V_{a30}$ to $V_{d30}$ from first to fourth readout electrodes 115a to 115d are delivered to individual input terminals. For this reason, as compared to the first embodiment, load of the image sensor is decreased. Thus, the accuracy is improved.

Figure 29:
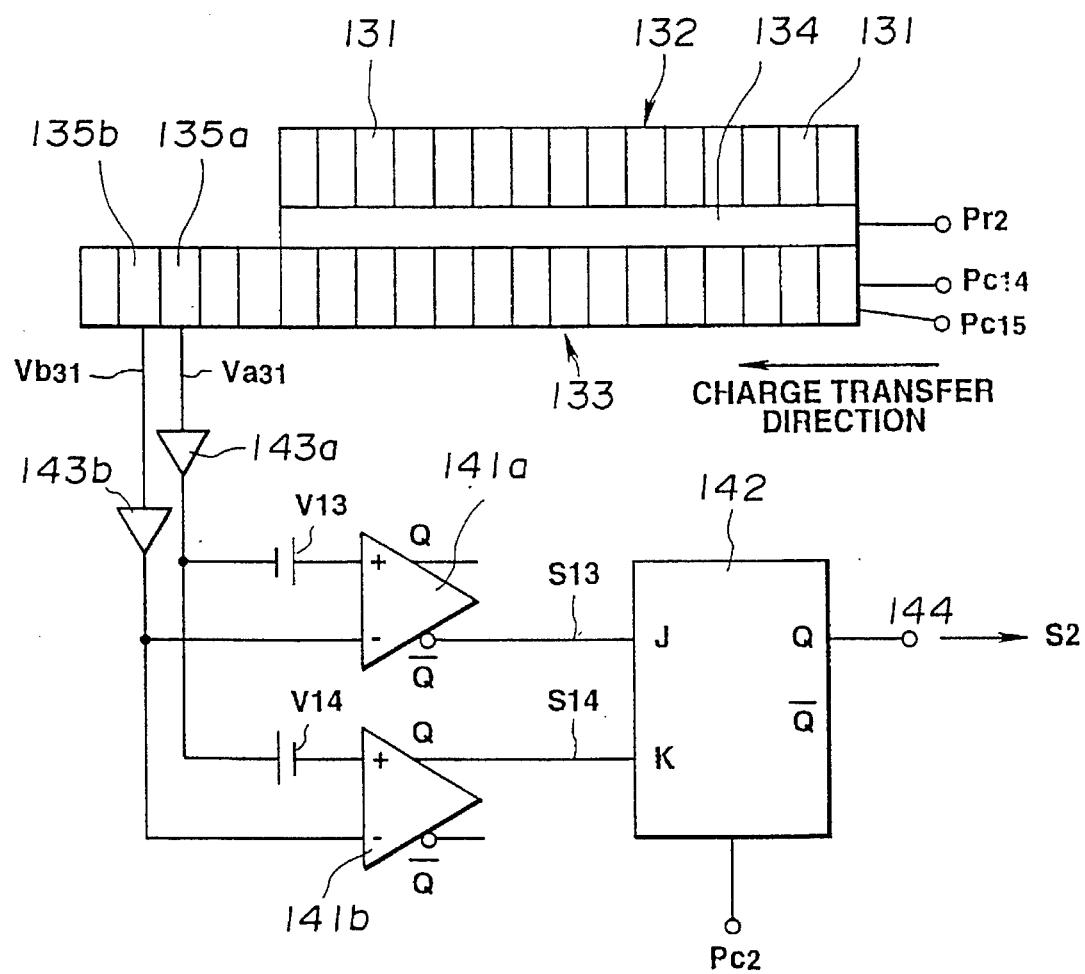
FIG. 29 is a circuit diagram showing the configuration of an image sensor and a binary circuit according to this invention.

FIG. 29 shows an image sensor and a binary circuit according to the third embodiment. The image sensor and the binary circuit of this embodiment have substantially the same configurations as those of the image sensor and the binary circuit according to the first embodiment shown in FIG. 3, but differs from the latter in that amplifiers 143a and 143b each comprised of, e.g., a source-follower circuit for current-amplifying first and second image pick-up signals $V_{a31}$ and $V_{b31}$ are connected immediately after first and second readout electrodes 135a and 135b, respectively.

The signal processing operation in the third embodiment is the same as the signal processing operation indicated by the timing chart of FIGS. 28 and 27 similarly to the first embodiment.

Accordingly, also in the third embodiment, similarly to the first embodiment, white and black corresponding to information which have been read in the image pick-up region 132 of the image sensor can be discriminated with high accuracy. Particularly, in the third embodiment, since image pick-up signals $V_{a31}$ and $V_{b31}$ from first and second readout electrodes 135a and 135b are respectively current-amplified at amplifiers 143a and 143b, load of the image sensor is decreased as compared to the first embodiment. Thus, accuracy is improved.

Figure 30:
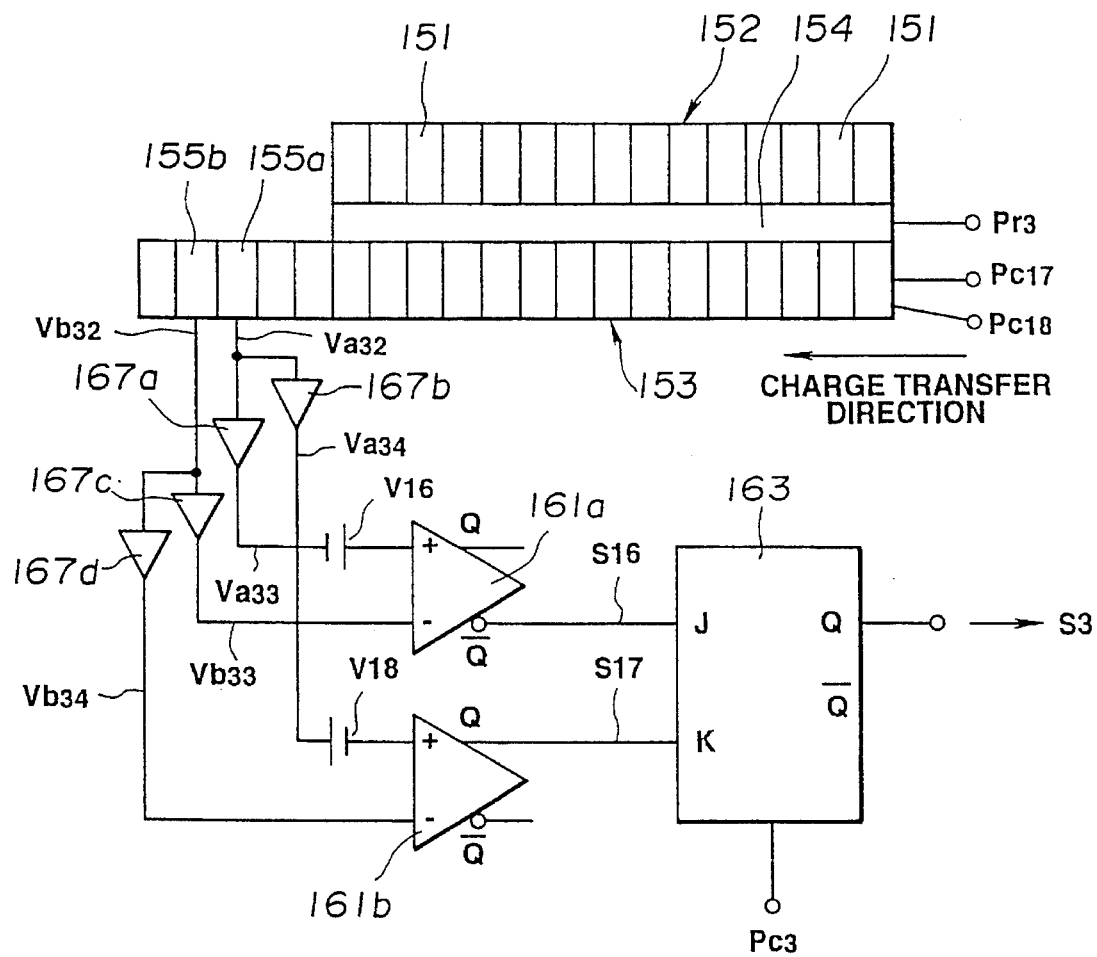
FIG. 30 is a circuit diagram showing the configuration of an image sensor and a binary circuit according to this invention.

FIG. 30 shows an image sensor and a binary circuit according to the fourth embodiment. The image sensor and the binary circuit of this embodiment have substantially the same configurations as those of the image sensor and the binary circuit according to the first embodiment shown in FIG. 3, but differs from the latter in that two amplifiers each comprised of, e.g., source-follower circuit (hereinafter referred to as first and second amplifiers 167a and 167b for convenience) are connected immediately after first readout electrode 155a; two amplifiers each comprised of a source-follower circuit (hereinafter referred to as third and fourth amplifiers 167c and 167d for convenience) are connected immediately after second readout electrode 155b; output signal $V_{a33}$ from first amplifier 167a is inputted to the + side input terminal of first comparator 161a; output signal $V_{a34}$ from second amplifier 167b is inputted to the + side input terminal of second comparator 161b; output signal $V_{b33}$ from third amplifier 167c is inputted to the − side input terminal of first comparator 161a; and output signal $V_{b34}$ from fourth amplifier 167d is inputted to the − side input terminal of second comparator 161b.

The signal processing, operation in the fourth embodiment is also the same as the signal processing operation indicated by the timing charts of FIGS. 26 and 27 similarly to the above-described first embodiment.

Accordingly, also in the fourth embodiment similarly to the first embodiment, white and black corresponding to information which have been read in image pick-up region 152 of the image sensor can be discriminated with high accuracy. Also in this case, since image pick-up signals $V_{a32}$ and $V_{b32}$ from first and second readout electrodes 155a and 155b are respectively individually current-amplified at first to fourth amplifiers 167a to 167d, load of the image sensor is decreased as compared to the first embodiment. Thus, the accuracy is improved. Particularly, in the fourth embodiment first and second image pick-up signals $V_{a32}$ and $V_{b32}$ from first an second readout electrodes 155a and 155b can be respectively independently compared at first comparator 161a and second comparator 161b. Thus, an erroneous operation based on interaction of first and second comparators 161a and 161b can be prevented.

As stated above, in the binary circuits according to the first to fourth embodiments, in the case where information which is needed to vary the threshold voltage every pixel like bar code is read by means of image sensor, it is possible to binarize (digitize) the information thus read to output it.

Further, since there is employed a system exhibiting the merit of the image sensor, i.e., a system of detecting a difference between an image pick-up signal and another image pick-up signal obtained by delaying the image pick-up signal by one transfer clock to allow such signal information to be binary information in a manner to have hysteresis characteristic in detection of that difference, the accuracy of binarization for information can be improved.

Further, since the binary circuit can be constituted with only first and second comparators and JK flip-flop circuit, the circuit configuration thereof is simplified. In addition, binary information can be obtained with high accuracy. Accordingly it is possible to attain reduction of the number of parts and low power consumption, and to realize high reliability as the binary circuit.

Further, since the first and second comparators are caused to have a circuit configuration including, as major component, RS flip-flop circuits composed of four n-channel type MOSFETs, on-chip implementation of the first and second comparators within the image sensor can be realized. Further, JK flip-flop circuit is caused to have a circuit configuration including, as major component, e.g., CMOS transistors, thereby making it possible to realize on-chip implementation within the image sensor of the binary circuit including JK flip-flop circuit.

Accordingly, in the case where image sensor having binary circuit according to this invention is utilized for, e.g., bar code reader, etc., the bar code reader can become compact and the reliability thereof can be improved.

While the example for allowing image pick-up information from the image sensor to be binary information has been described in the above-described embodiments, such binarization method can be applied to the case where input signals serially delivered are caused to be binary information in an ordinary signal processing.

Figure 31:
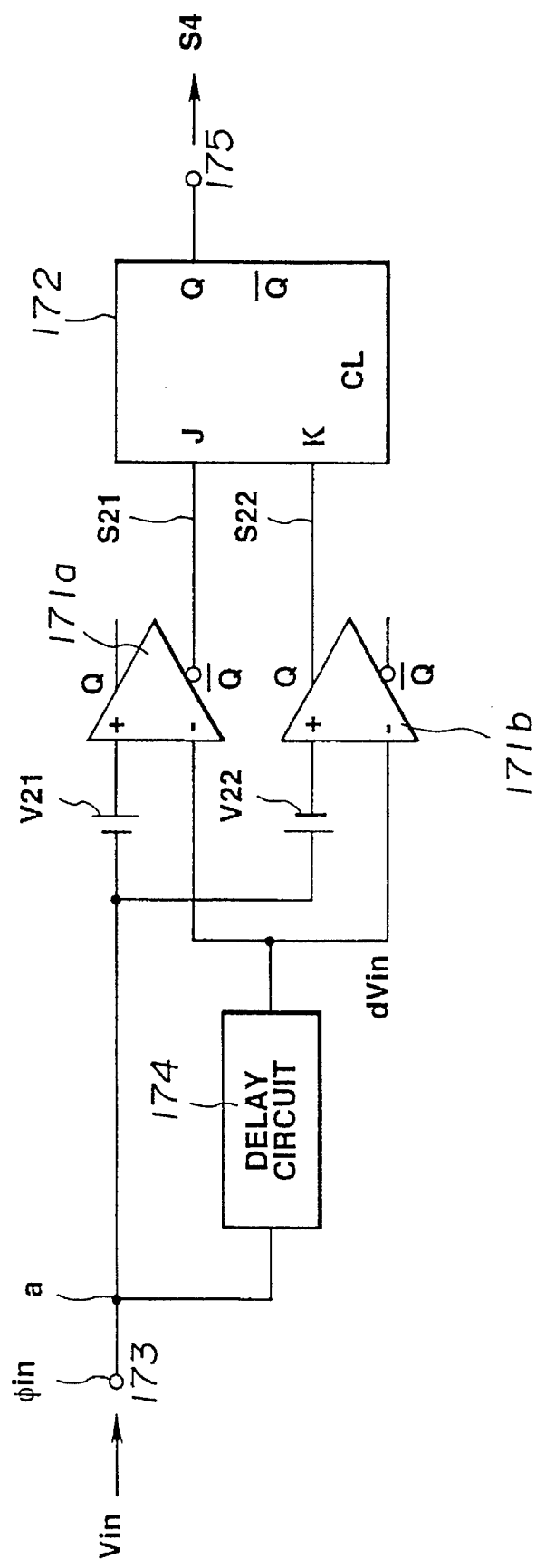
FIG. 31 is a circuit diagram showing the circuit configuration of a fifth embodiment in which the binary circuit according to this embodiment is applied to binarization of an input signal serially delivered in an ordinary signal processing.

In actual terms, as indicated by FIG. 31 showing the fifth embodiment of this invention, a delay circuit 174 for carrying out delay suitable for the system is connected to the succeeding stage of input terminals φin 173, an input signal Vin from input terminal φin 173 is inputted to respective + side input terminals of first and second comparators 171a and 171b, a delay signal dVin from delay circuit 174 is inputted to respective − side input terminals of first and second comparators 171a and 171b, an output signal S21 from the inverting Q terminal of first comparator 171a is inputted to J terminal of JK flip-flop circuit 172, and an output signal S from Q terminal of second comparator 171b is inputted to k terminal of JK flip-flop circuit 172.

Also in the fifth embodiment, similarly to the first embodiment, setting is made such that a potential on the + side input terminal in the first comparator 171a is caused to be higher than a potential on the − side input terminal by voltage V21, and setting is made such that a potential on the + side input terminal in the second comparator 171b is caused to be lower than a potential on the − side input terminal thereof by voltage V22.

In the binary circuit shown in FIG. 31, similarly to the first embodiment, it is possible to binarize (digitize) input signal Vin with high accuracy. When applied to, e.g., binary circuit assembled in a demodulator of the reproducing system of reading pit information from an optical disc which is a disk-shaped recording medium, pit information is permitted to be binary information with high accuracy. Thus, the reproducing characteristic of the optical disc can be improved.

As described above, in accordance with the binary circuit according to this invention, there are provided comparing means supplied with an input signal and an output signal from delay means to carry out level comparison there between, and binary signal generating means supplied with an output signal of the comparing means to detect a level change point of the output signal. Accordingly, it is possible to obtain binary information of various input signals. Thus, it is possible to attain reduction of the number of parts and low power consumption. Particularly, in the case here such binary circuit is caused to function as a binary circuit in the CCD image sensor, it is possible to obtain binary information of image pick-up signal from the CCD image sensor with high accuracy by a simple circuit configuration. Thus, this binary circuit can be implemented as on-chip configuration within the CCD image sensor.

Further, in accordance with the CCD solid-state image pick-up apparatus according to another invention, there are provided image pick-up region where a large number of light receiving sections for converting an incident light into a quantity of signal charges corresponding to a light quantity thereof are arranged, charge transfer section by CCD for unidirectionally transferring the signal charges from the image pick-up region, and binary circuit including comparing means having hysteresis characteristic and adapted to carry out level comparison between image pick-up signals from signal output sections having quantities of delays from each other in the charge transfer section and binary signal generating means for detecting a level change point of an output signal from the comparing means to prepare binary signal. Accordingly, it is possible to obtain binary information of image pick-up signals with high accuracy by simple circuit configuration. As a result, binary circuit which can attain reduction of the number of parts and low power consumption can be implemented as on-chip configuration. Thus, the CCD solid-state image pick-up apparatus itself can become compact and the reliability thereof can be improved.

What is claimed is:

1. A binary circuit comprising:

an input terminal supplied with an input signal;

delay means supplied with the input signal from the input terminal and adapted to delay the input signal;

comparing means supplied with the input signal and an output signal from the delay means and adapted to compare levels thereof; and binary signal generating means supplied with an output signal of the comparing means and adapted to detect a change point of the level of the output signal;

wherein the comparing means is composed of a first comparator for equivalently adding an offset potential to one input to carry out level comparison of the input signal, and a second comparator for equivalently subtracting an offset potential from one input to carry out level comparison of the input signal.

2. A binary circuit comprising:

an input terminal supplied with an input signal;

delay means supplied with the input signal from the input terminal and adapted to delay the input signal;

comparing means supplied with the input signal and an output signal from the delay means and adapted to compare levels thereof; and binary signal generating means supplied with an output signal of the comparing means and adapted to detect a change point of the level of the output signal;

wherein the comparing means is composed of a first comparator such that potentials on two input terminals supplied with input signals are unequally set and signals of the same potential are inputted to the two input terminals, the first comparator outputs a signal of high level, and a second comparator such that potentials on the two input terminals supplied with the input signals are unequally set and signals of the same potential are inputted to the two input terminals, the second comparator outputs a signal of low level; and wherein the binary signal generating means is comprised of a flip-flop circuit adapted to be set by an input of the signal of low level from the first comparator and to be reset by an input of the signal of high level from the second comparator.

3. A CCD solid-state image pick-up apparatus comprising:

an image pick-up region where a large number of light receiving sections for converting an incident light into a quantity of signal charges corresponding to a light quantity thereof are arranged;

a charge transfer section by CCD for unidirectionally transferring the signal charges from the image pick-up region; and a binary circuit including comparing means having a hysteresis characteristic and adapted to carry out level comparison between image pick-up signals having quantities of delays different from each other in the charge transfer section, and binary signal generating means for detecting a level change point of an output signal from the comparing means to prepare a binary signal;

wherein the comparing means is composed of a first comparator adapted to equivalently add an offset potential to one input to carry out level comparison between the image pick-up signals, and a second comparator for equivalently subtracting an offset potential from one input to carry out level comparison between the image pick-up signals.

4. A CCD solid-state image pick-up apparatus as set forth in claim 3, wherein the comparing means is composed of a first comparator adapted so that when potentials on two input terminals supplied with image pick-up signals having quantities of delays different from each other are unequally set, and signals of the same potential are inputted to the two input terminals, the first comparator outputs a signal of high level, and a second comparator adapted so that when potentials on two input terminals supplied with the image pick-up signals having quantities of delays different from each other are unequally set, and signals of the same potential are inputted to the two input terminals, the second comparator outputs a signal of low level; and wherein the binary signal generating means is comprised of a flip-flop circuit adapted to be set by an input of the signal of low level from the first comparator, and to be reset by an input of the signal of high level from the second comparator.

5. A CCD solid-state image pick-up apparatus as set forth in claim 4, further comprising:

an amplifier for current-amplifying respective image pick-up signals from respective readout electrodes of signal output sections each comprised of a floating gate of the charge transfer section.

6. A CCD solid-state image pick-up apparatus as set forth in claim 4, wherein respective image pick-up signals from two readout electrodes on the preceding stage side of four readout electrodes adjacent to each other of signal output sections each comprised of a floating gate of the charge transfer section are delivered to the first comparator, and respective image pick-up signals from two readout electrodes on the succeeding stage side are delivered to the second comparator, and wherein an output signal of the first comparator is delayed by delay means so that its output timing is caused to be in correspondence with that of an output signal of the second comparator, whereby respective output signals of the first and second comparators are delivered to the flip-flop circuit.

* * * * *